US008304479B2

(12) United States Patent
Zong et al.

(10) Patent No.: US 8,304,479 B2
(45) Date of Patent: *Nov. 6, 2012

(54) METHODS AND SYSTEMS FOR IMPROVING OPEN TIME AND DRYING TIME OF LATEX BINDERS AND AQUEOUS COATINGS

(75) Inventors: Zhengang Zong, Pennington, NJ (US); Yi-Zhong Li, East Brunswick, NJ (US); Jose Ruiz, Burlington, NJ (US); Herve Adam, Clarksburg, NJ (US)

(73) Assignee: Rhodia Operations, Aubervilliers (FR)

( * ) Notice: Subject to any disclaimer, the term of this patent is extended or adjusted under 35 U.S.C. 154(b) by 223 days.

This patent is subject to a terminal disclaimer.

(21) Appl. No.: 12/798,832

(22) Filed: Apr. 13, 2010

(65) Prior Publication Data

US 2011/0144248 A1   Jun. 16, 2011

Related U.S. Application Data

(60) Provisional application No. 61/284,055, filed on Dec. 11, 2009.

(51) Int. Cl.
*C08K 5/06* (2006.01)

(52) U.S. Cl. ........ 524/366; 524/367; 524/368; 524/369; 524/372

(58) Field of Classification Search .................. 524/366, 524/367, 368, 369, 372
See application file for complete search history.

(56) References Cited

U.S. PATENT DOCUMENTS

| | | | |
|---|---|---|---|
| 4,600,516 A | 7/1986 | Wester et al. | 252/8.55 |
| 4,647,610 A | 3/1987 | Sperry et al. | 524/377 |
| 5,082,591 A | 1/1992 | Marchetto et al. | 252/351 |
| 5,211,747 A | 5/1993 | Breton et al. | 106/20 |
| 5,221,496 A | 6/1993 | Holland | 252/143 |
| 5,270,380 A | 12/1993 | Adamson et al. | 524/556 |
| 5,340,394 A | 8/1994 | Elsamanoudi | 106/500 |
| 5,364,904 A | 11/1994 | Farmer et al. | 524/832 |
| 5,399,617 A | 3/1995 | Farwaha et al. | 524/815 |
| 5,610,215 A | 3/1997 | Nonweiler et al. | 524/376 |
| 5,610,225 A | 3/1997 | Farwaha et al. | 524/558 |
| 5,719,244 A | 2/1998 | Farwaha et al. | 526/238.2 |
| 5,770,760 A | 6/1998 | Robinson | 560/221 |
| 5,874,495 A | 2/1999 | Robinson | 524/300 |
| 5,874,498 A | 2/1999 | Daniels et al. | 524/563 |
| 5,906,962 A | 5/1999 | Pallas et al. | 504/116 |
| 5,939,514 A | 8/1999 | Brown et al. | 528/229 |
| 6,017,869 A | 1/2000 | Lu et al. | 510/384 |
| 6,022,841 A | 2/2000 | Lu et al. | 510/384 |
| 6,143,710 A | 11/2000 | Lu et al. | 510/384 |
| 6,146,570 A | 11/2000 | Stern | 264/141 |
| 6,218,455 B1 | 4/2001 | Smith et al. | 524/457 |
| 6,268,327 B1 | 7/2001 | Lu et al. | 510/384 |
| 6,391,952 B1 | 5/2002 | Bett et al. | 524/160 |
| 6,410,655 B2 | 6/2002 | Okubo et al. | 525/330.1 |
| 6,465,605 B2 | 10/2002 | Breindel et al. | 528/403 |
| 6,506,794 B1 | 1/2003 | Sianawati et al. | 514/476 |
| 6,682,723 B2 | 1/2004 | Parry et al. | 424/62 |
| 6,933,415 B2 | 8/2005 | Zhao et al. | 568/616 |
| 6,946,509 B2 | 9/2005 | He | 524/413 |
| 7,217,758 B2 | 5/2007 | Buckmann et al. | 524/501 |
| 7,238,645 B1 | 7/2007 | Chow et al. | 504/358 |
| 7,488,841 B2 | 2/2009 | Yamawaki et al. | 560/169 |
| 2002/0077267 A1 | 6/2002 | Parry et al. | 510/337 |
| 2003/0073765 A1 | 4/2003 | Ddamulire et al. | 524/115 |
| 2004/0102568 A1 | 5/2004 | Bridgewater et al. | 524/556 |
| 2004/0209995 A1 | 10/2004 | Adam et al. | 524/800 |
| 2004/0235982 A1 | 11/2004 | Rabasco et al. | 523/122 |
| 2005/0265951 A1 | 12/2005 | Yamawaki et al. | 424/70.22 |
| 2008/0058473 A1 | 3/2008 | Freidzon et al. | 525/191 |
| 2008/0119600 A1 | 5/2008 | Anchor et al. | 524/394 |
| 2009/0143502 A1 | 6/2009 | Obie | 524/37 |
| 2009/0173917 A1 | 7/2009 | Allen et al. | |
| 2009/0186972 A1 | 7/2009 | Zong et al. | 524/369 |

FOREIGN PATENT DOCUMENTS

| | | |
|---|---|---|
| EP | WO 2009/138523 A3 | 5/2009 |
| FR | 2796074 | 1/2001 |
| WO | PCT/IB97/01165 | 9/1997 |
| WO | PCT/US98/06437 | 4/1998 |
| WO | WO 98/12921 | 4/1998 |
| WO | WO 98/45212 | 10/1998 |
| WO | PCT/US2007/008411 | 4/2007 |
| WO | WO 2007/089807 A2 | 8/2007 |
| WO | WO 2007/117512 A1 | 10/2007 |
| WO | WO 2009/138523 A2 | 5/2009 |

OTHER PUBLICATIONS

Yoann Lefeuvre, et al., "Optical Film Formation Analysis" presented at The Waterborne Symposium, Advances in Sustainable Coatings Technology, Feb. 18-20, 2009, pp. 91-100. Andrews, M.D., Journal of Paint Technology 1974, vol. 46, No. 598, pp. 40-46, "Influence of Ethylene and Propylene Glycols on Drying Characteristics of Latex Paints".

Akkerman, J., et al., European Coatings Congress, Nuremberg, Germany Mar. 30-Apr. 1, 2009, ID: 10.6, Architectural Coatings, "New developments on open time resins for waterborne decorative coatings".

Overbeek, A., et al., Progress in Organic Coatings 48, 2003, pp. 125-139, "New generation decorative paint technology".

Sarac, A.S., Progress in Polymer Science, vol. 24, No. 8, Oct. 1, 1999, pp. 1149-1204 "Redox polymerization".

(Continued)

*Primary Examiner* — Edward Cain

(57) ABSTRACT

Disclosed are low Tg latex polymers and low VOC aqueous coating compositions having an improved open time profile, as well as drying time, stain resistance, wet edge time, low temperature film formation, block resistance, adhesion, water sensitivity and low-VOC content. The latex polymers and aqueous coating compositions include at least one latex polymer derived from at least one monomer copolymerized or alkoxylated compounds or blended with an alkoxylated compound, for example an alkoxylated tristyrylphenol or an alkoxylated tributylphenol. Also provided is an aqueous coating or adhesive composition including at least one latex polymer, water and one or a blend of two or more open time additives or drying time additives. The blend can comprise nonionic and anionic open time additives. Typically, the open time and/or drying time additive is present in an amount greater than about 1.3% by weight of the polymer or composition, typically in an amount greater than about 2% by weight of the polymer or composition, in an amount greater than about 4% by weight of the polymer or composition, in an amount greater than about 7.5% by weight of the polymer or composition, in an amount greater than about 10% by weight of the polymer or composition or in an amount greater than about 20% by weight of the polymer or composition.

57 Claims, 1 Drawing Sheet

OTHER PUBLICATIONS

Brunel, L., et al. Nov. 12, 2007, vol. 15, No. 23 / Optics Express 15250, "Adaptive Speckle Imaging Interferometry: a new technique for the analysis of micro-structure dynamics, drying processes and coating formation".

Dihang, Helene, et al, Aug. 2009, Paint & Coatings Industry, pp. 28-31 "Optical Film Formation Analysis".

Crivello, et al., Journal of Polymer Science: Part A Polymer Chemistry, vol. 31, 1847-1857 (1993) "Synthesis and Characterization of Novel Photopolymerizable Multifunctional 2-Propenyl Ether Analogues".

Bosen, S.F., et al, Ullmann's Encyclopedia of Industrial Chemistry, 5th Ed., vol. A3, VCH Verlag, pp. 23-32, 1985 "Antifreezes".

Blackley, D.C., Polymer Latices Science and Technology, 2nd Ed., vol. 1, Chapman & Hall, 1997, pp. 278-289, "Agglomeration by subjecting the latex to freezing and thawing".

Aslamazova, T.R., Colloid Journal, vol. 61, No. 3, 1999, pp. 268-273, "Stability of Emulsifier-Free Acrylate Latexes with Respect to Freezing and Thawing".

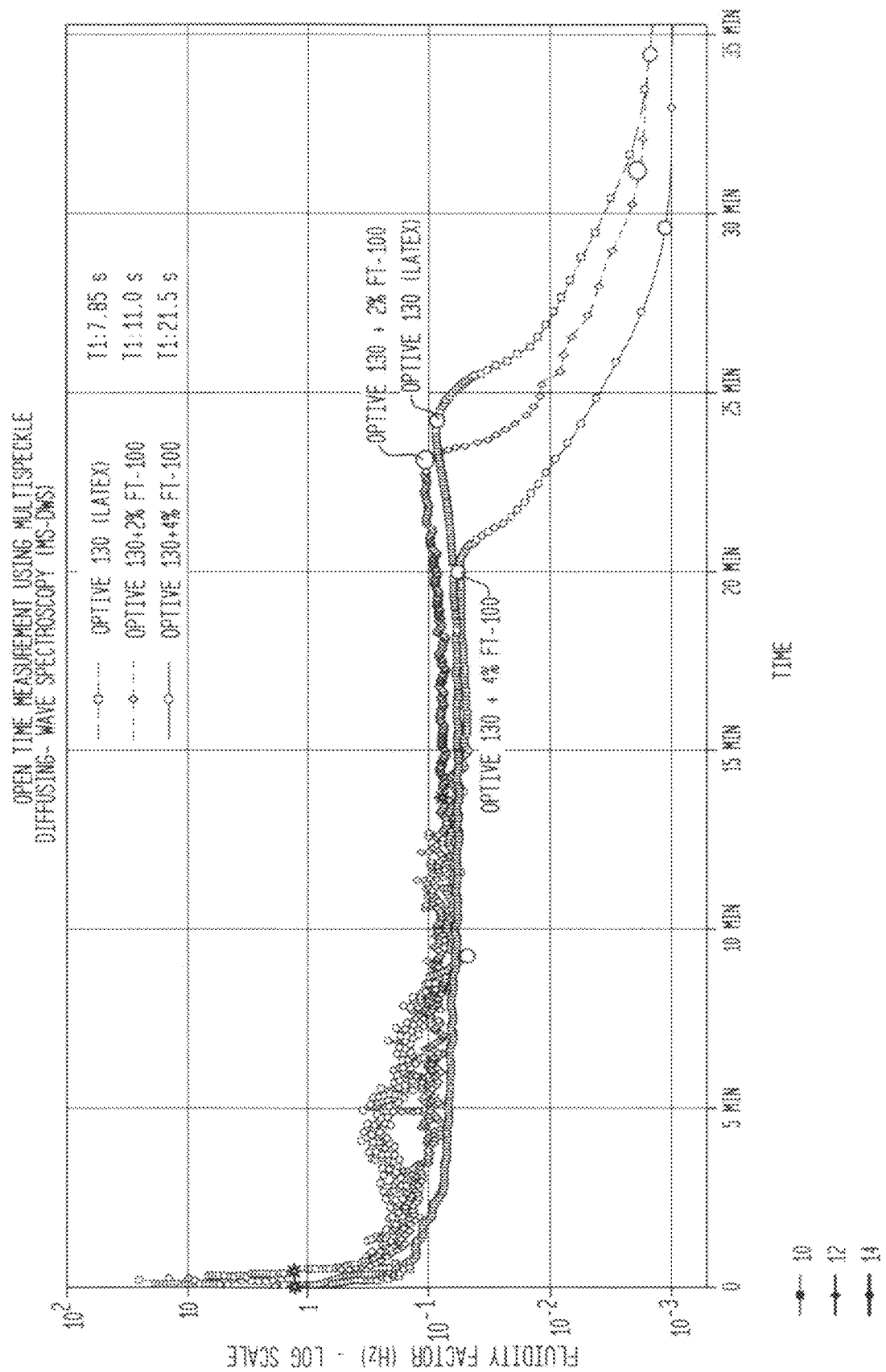

METHODS AND SYSTEMS FOR IMPROVING OPEN TIME AND DRYING TIME OF LATEX BINDERS AND AQUEOUS COATINGS

CROSS REFERENCE TO RELATED APPLICATIONS

This application is a continuation-in-part application of U.S. application Ser. No. 12/321,256, filed Jan. 16, 2009, hereby incorporated by reference, which claims the benefit of U.S. Provisional Application Ser. No. 61/022,206, filed Jan. 18, 2008, U.S. Provisional Application Ser. No. 61/022,443, filed Jan. 21, 2008 and U.S. Provisional Application Ser. No. 61/199,936, filed Nov. 21, 2008, all herein incorporated by reference. This application also claims the benefit of U.S. Provisional Application Ser. No. 61/284,055, filed Dec. 11, 2009.

FIELD OF THE INVENTION

The present invention relates to the use of a particular family of alkoxylated compounds, e.g. alkoxylated tristyrylphenol and alkoxylated tributylphenol, for improving open time characteristics of aqueous coating compositions such as paint and paper coating compositions. In particular, the present invention relates to the use of certain reactive alkoxylated compound based monomers, surface active alkoxylated compound surfactants, and surface active alkoxylated compound additives to improve open time and drying time characteristics of aqueous latex dispersions, aqueous latex binders and aqueous coatings.

BACKGROUND OF THE INVENTION

In the paints and coatings industry, traditional solvent-borne paints and coatings are being replaced with waterborne system due to concerns regarding the impact of Volatile Organic Compounds (VOC) to human health and the environment. In addition, recently enacted environmental legislation requires the reduction of the amount of Volatile Organic Compounds (VOC) in coatings. For example, SCAQMD (South Coast Air Quality Management District) in California and OTC (Ozone Transport Commission) in the East Coast states, have required reduced amounts of VOC emissions of coatings & paints products, especially architectural and industrial paints & coatings. (After application of a coating to a substrate, VOCs slowly evaporate into the surroundings.)

These regulations are forcing polymers and paints manufactures to develop lower VOC products. However, the waterborne technologies for lower or zero VOC paints & coatings have many challenges and drawbacks especially in achieving the key performances compared to solvent-based coatings or high VOC paint products.

For example, reduced or limited open time or wet edge time is one of the major challenges of low or zero VOC paints & coatings. Open time of the paints is defined as a period of time that the wet paint remains workable after it has been applied to a substrate and allow corrections such as rebrushing or rolling without resulting in any surface defects. Wet edge time refers to the time when a painter applies fresh paint to a wet painted area and the fresh paint can merge in without resulting in visible lap in the dried coating films.

Open time of waterborne or aqueous-based latex paints has been a major challenge compared to solvent-based paints because of fast evaporation of water in the aqueous-based paints. Typically, the open time of solvent-borne coatings and paints, which typically contain the organic solvents such as toluene or xylene, is about 30 to 45 minutes.

For the traditional waterborne coatings & paints, one traditional method is to add ethylene glycol or glycol ethers (or other high VOC solvents) to increase the open time or wet-edge time. It is believed that such organic solvents remain in or around the latex particles and assist the latex particle in moving freely even when all of the water has evaporated from the aqueous paint system. The use of glycols in aqueous coating formulations has various advantages to aqueous products, e.g., by increasing open time/wet edge time, providing freeze thaw stability, aiding polymer coalescence, and improving flow and leveling.

However, in low or no VOC formulations, the use of these glycols are substantially reduced or eliminated. When latex binders are formulated into low or near zero VOC aqueous coatings and paints, i.e., the use of glycols and other VOC's are substantially reduced or eliminated, the open time was reduced significantly and is in the range of 3-5 minutes. The insufficient open time resulted in poor application on larger substrates as well as surface defects in coating films.

Thus, it is desirable to have coatings and paint formulations without or with substantially reduced VOC content, which would include additives such as open-time additives, coalescing agents, freeze-thaw agents, etc. Latex binder manufactures are thus forced to develop low VOC binders to meet the requirements of paints and coatings industry, yet at the same time meeting or exceeding coating performance standards set in the industry.

SUMMARY OF THE INVENTION

The present invention relates to the use of a particular family of alkoxylated compounds with bulky hydrophobic groups, e.g., alkoxylated tristyrylphenols or alkoxylated tributylphenols, for improving open time characteristics, as well as other properties such as freeze-thaw stability, drying time, low temperature film formation, stain resistance, film gloss, dispersibility, hiding and scrub resistance, foam resistance, block resistance, adhesion and water sensitivity, among others, of latex binders, resins, glues, adhesives, inks, sealants, cement compositions, coatings, which include but is not limited to paints.

While not being bound to theory, it is theorized the present invention in part stabilizes the latex particles using steric effects of larger hydrophobic groups to form a protective layer on the surfaces of soft latex particles. The large hydrophobic groups adsorbed or grafted onto the latex particles or co-polymerized into the latex particles prevent these latex particles from approaching the surfaces of other soft latex particles and increase the distance of separation between soft latex particles. The alkylene, e.g., ethylene oxide units from the surfactant of the alkoxylated compounds chains also form a layer which interacts with the aqueous medium.

In accordance with the invention, aqueous coating compositions (e.g. latex paints, latex dispersion) including an alkoxylated compound can be produced having open time characteristics with the addition of little or no high VOC solvents such as glycol.

The alkoxylated compounds can be employed in a number of ways for improving open time characteristics, as well as drying time characteristics, of latex binders, paints and coatings. The present invention may employ polymerizable reactive alkoxylated monomers as a reactant during emulsion polymerization to form the latex polymer. The present invention may employ one or more surface active alkoxylated compounds described herein as a surfactant (e.g., emulsifier) during emulsion polymerization to form the latex polymer. The present invention may employ a surface active alkoxylated compound as an additive to latex polymer-containing formulations such as coatings, including but not limited to paints; as well as an additive for adhesives, including but not limited to pressure sensitive adhesives; glues; resins; sealants; inks, including but not limited to UV inks, conventional inks, hybrid inks, and water-based inks; and the like.

In one aspect, the present invention is a latex polymer derived from at least one first monomer and at least one polymerizable reactive alkoxylated second monomer having the structural formula IA:

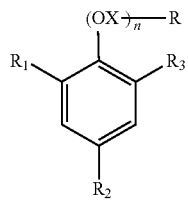

IA wherein R1, R2 and R3 are independently selected from: a $C_1$-$C_{18}$ alkyl, hydroxyalkyl, cycloalkyl, aryl or aralkyl, —H, tert-butyl, butyl, isobutyl,

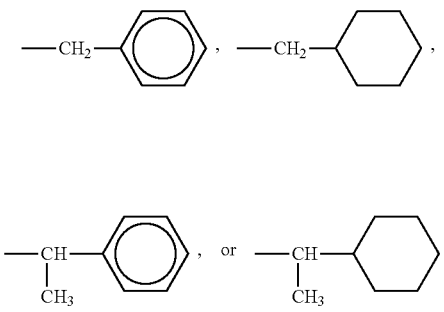

wherein X is a divalent hydrocarbon radical selected from linear or branched alkylene radicals having from 2 to 8 carbon atoms; wherein n is an integer of from 1 to 100, wherein R comprises an ethylenically unsaturated group. In one embodiment, R can be acrylate, $C_1$-$C_6$ alkyl acrylate, allyl, vinyl, maleate, itaconate or fumarate. R can also be selected from acrylo, methacrylo, acrylamido, methacrylamido, diallylamino, allyl ether, vinyl ether, α-alkenyl, maleimido, styrenyl, and/or α-alkyl styrenyl groups.

In another embodiment, R has a chemical structure: $R^aCH$=$C(R^b)COO$—, wherein if $R^a$ is H, then $R^b$ is H, $C_1$-$C_4$ alkyl, or —$CH_2COOX$; if $R^a$ is —$C(O)OX$, then $R^b$ is H or —$CH_2C(O)OX^a$; or if $R^a$ is $CH_3$, then $R^b$ is H and $X^a$ is H or $C_1$-$C_4$ alkyl. R can, in another embodiment, have chemical structure: —HC=CYZ or —OCH=CYZ, wherein Y is H, $CH_3$, or Cl; Z is CN, Cl, —$COOR^c$, —$C_8H_4R^c$, —$COOR^d$, or —HC=$CH_2$; $R^d$ is $C_1$-$C_8$ alkyl or $C_2$-$C_8$ hydroxy alkyl; $R^c$ is H, Cl, Br, or $C_1$-$C_4$ alkyl.

In another aspect, the present invention is a latex polymer derived from at least one first monomer and at least one second monomer having the structural formula IB:

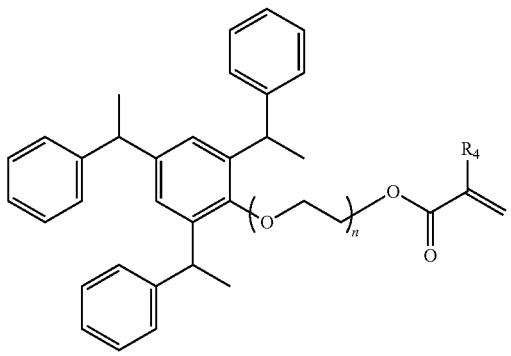

IB wherein n is an integer of from about 1 to about 100, and $R_4$ is selected from H and $C_1$-$C_6$ alkyl. In one embodiment, n is an integer of from about 3 to about 80, typically, about 4 to about 60, and more typically from about 8 to about 60. The at least one first monomer can, in one embodiment, comprise at least one acrylic monomer selected from the group consisting of acrylic acid, acrylic acid esters, methacrylic acid, and methacrylic acid esters. In another embodiment, the latex polymer can be derived from one or more monomers selected from styrene, alpha-methyl styrene, vinyl chloride, acrylonitrile, methacrylonitrile, ureido methacrylate, vinyl acetate, vinyl esters of branched tertiary monocarboxylic acids, itaconic acid, crotonic acid, maleic acid, fumaric acid, ethylene, or $C_4$-$C_8$ conjugated dienes.

In another embodiment, the composition of the present invention is freeze-thaw stable with improved open time, wet edge time and drying time characteristics and the polymer has a glass transition temperature (Tg) of between about −20° C. and about 50° C. In one embodiment the Tg is between about −15° C. and about 30° C. In one embodiment the Tg is between about −15° C. and about 20° C. In one embodiment the Tg is between about −10° C. and about 10° C. In one embodiment the Tg is between about −10° C. and about 0° C.

In another embodiment, the polymer of the present invention has a mean particle size (sometimes referred to as mean particle diameter, $D_{50}$) of less than about 200 nm, in another embodiment a mean particle size of less than about 190 nm, and in yet another embodiment a mean particle size of less than about 175 nm. In another embodiment, the polymer of the invention has a $D_{50}$ of less than 150 nm. In yet another embodiment, the polymer of the invention has a $D_{50}$ of less than 100 nm.

In another aspect, the present invention is a latex coating composition comprising: (a) a latex polymer as described herein; and (b) water. It is understood that the latex coating composition can contain other additive/ingredients including but not limited to biocides, surfactants, pigments, dispersants, etc., and others which would be known to a person skilled in the art. The latex coating composition can further comprise one or more open time additives comprising an ethoxylated tristyrylphenol having the structural formula IC:

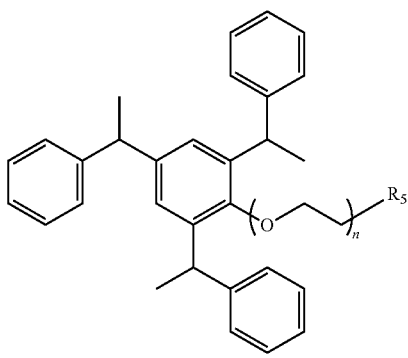

wherein, n is an integer of from 1 to 100, wherein $R_5$ is a hydroxyalkyl group, —OH, —OCH$_3$, —OC$_2$H$_5$, —OC$_3$H$_7$, —OC$_4$H$_9$, —OC$_5$H$_{11}$, —OC$_6$H$_{13}$, —Cl, —Br, —CN, Phosphonate (—PO$_3^-$M$^+$), Phosphate (PO$_4^-$M$^+$), Sulfate (SO$_4^-$M$^+$), Sulfonate (SO$_3^-$M$^+$), carboxylate (COO$^-$M$^+$), a nonionic group, an anionic group, a $C_1$-$C_{12}$ alkyl, hydroxyalkyl, cycloalkyl, aryl or aralkyl, or a quaternary ammonium ion, wherein M+ is a cation including but not limited to H$^+$, Na$^+$, NH$_4^+$, K$^+$, Li$^+$ or —NR$^+_4$. In one embodiment, n is an integer of from about 4 to 80, and in another embodiment from about 1 to 40. In another embodiment, $R_5$ is selected from the group consisting of —OH, —OCH$_3$, —OC$_2$H$_5$, —OC$_3$H$_7$, —OC$_4$H$_9$, —OC$_5$H$_{11}$, —OC$_6$H$_{13}$, —Cl, —Br, —CN, Phosphonate (—PO$_3^-$M$^+$), Phosphate (PO$_4^-$M$^+$), Sulfate (SO$_4^-$M$^+$), Sulfonate (SO$_3^-$M$^+$), carboxylate (COO$^-$M$^+$), a nonionic group, a $C_1$-$C_{12}$ alkyl group, a $C_1$-$C_{12}$ hydroxyalkyl group, a $C_1$-$C_{12}$ cycloalkyl group, a $C_1$-$C_{12}$ aryl group, a $C_1$-$C_{12}$ aralkyl group and a quaternary ammonium ion, wherein M+ is a cation including but not limited to H$^+$, Na$^+$, NH$_4^+$, K$^+$, Li$^+$ or —NR$^+_4$.

In one embodiment, the latex coating composition contains an open time additive in an amount effective to lengthen the open time of the composition to greater than 4 minutes, typically greater than 6 minutes. In one embodiment, improved open time characteristics means that the open time of a coating or adhesive is made greater than 4 minutes. In one embodiment, improved open time characteristics means that the open time of a coating or adhesive is made greater than 6 minutes. In one embodiment, improved open time characteristics means that the open time of a coating or adhesive is made greater than 8 minutes. In one embodiment, improved open time characteristics means that the open time of a coating or adhesive is made greater than 10 minutes. In one embodiment, improved open time characteristics means that the open time of a coating or adhesive is made greater than 12 minutes.

In one embodiment, the effective amount of the additive is greater than about 1% by weight of the polymer, typically in an amount greater than about 1.6% by weight of the polymer. In another embodiment, the latex coating composition contains an open time additive in an amount greater than about 2% by weight of the polymer, typically in an amount greater than about 4% by weight of the polymer. In another embodiment, the latex coating composition contains an open time additive in an amount greater than about 7.5% by weight of the polymer, typically in an amount greater than about 8% by weight of the polymer. In yet another embodiment, the latex coating composition contains an open time additive in an amount greater than about 10% by weight of the polymer. In yet another embodiment, the latex coating composition contains an open additive in an amount greater than about 20% by weight of the polymer. In another embodiment, the latex coating composition contains an open time additive in an amount between about 1.6% and 7.5% by weight of the polymer.

In one embodiment, the aforementioned latex coating composition has improved open time characteristics where the latex polymer has a glass transition temperature (Tg) of between about −20° C. and about 50° C., typically between about −10° C. and about 10° C., more typically between about −10° C. and about 0° C. In another embodiment, a latex polymer in the aforementioned latex coating has a mean particle size of less than about 200 nm, in another embodiment $D_{50}$ is less than about 190 nm, in another embodiment $D_{50}$ is less than about 175 nm, in yet another embodiment $D_{50}$ is less than 150 nm, and in a further embodiment $D_{50}$ is less than 100 nm.

In yet another aspect, the present invention is a method of preparing a latex polymer, comprising copolymerizing (1) at least one first monomer with (2) at least one second monomer, the second monomer a polymerizable reactive tristyrylphenol having the structural formula IA:

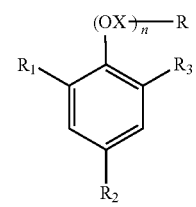

wherein R1, R2 and R3 are independently selected from:

a $C_1$-$C_{18}$ alkyl, hydroxyalkyl, cycloalkyl, aryl or aralkyl, —H, tert-butyl, butyl, isobutyl,

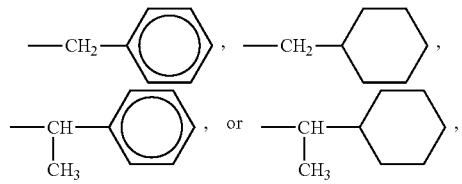

wherein X is a divalent hydrocarbon radical selected from linear or branched alkylene radicals having from 2 to 8 carbon atoms; wherein n is in the range of 1-100, wherein R is an ethylenically unsaturated group including but not limited to acrylate, $C_1$-$C_{10}$ alkyl acrylate, allyl, vinyl, maleate, itaconate or fumarate. R can also be selected from acrylo, methacrylo, acrylamido, methacrylamido, diallylamino, allyl ether, vinyl ether, α-alkenyl, maleimido, styrenyl, and/or α-alkyl styrenyl groups. R can in another embodiment is a $C_1$-$C_6$ alkyl acrylate, allyl, vinyl, maleate, itaconate or fumarate.

In a further aspect, the present invention is a method of preparing latex polymer having improved open time characteristics and/or drying time characteristics when utilized in a coating or adhesive composition, comprising copolymerizing (1) at least one latex monomer with (2) at least one polymerizable reactive tristyrylphenol having the structural formula IB:

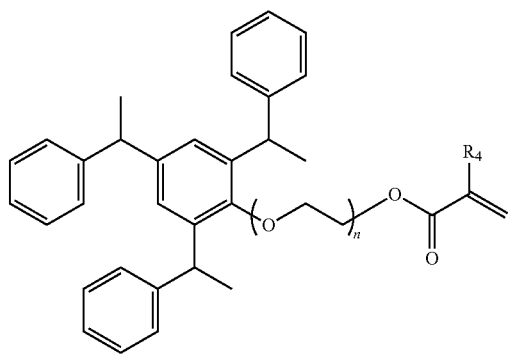

wherein n is an integer of from 1 to 100, and $R_4$ is selected from H and $C_1$-$C_{10}$ alkyl, typically $C_1$-$C_6$ alkyl.

In one embodiment, in one or both of the aforementioned methods, an aqueous dispersion of the polymer is has an open time of greater than 4 minutes, typically greater than 6 minutes, more typically greater than 8 minutes, where the polymer comprises a glass transition temperature (Tg) of between about −20° C. and about 50° C., more typically between about −15° C. and about 40° C., most typically between about −10° C. and about 0° C. In another embodiment, the polymer utilized in one or more of the above-referenced methods comprises a mean particle size of less than about 200 nm, more typically a mean particle size of less than about 190 nm, and most typically a mean particle size of less than about 175 nm.

In yet another aspect, the present invention is a method of preparing latex polymer which imparts improved open time characteristics when utilized in a coating or adhesive composition, comprising copolymerizing (1) at least one first monomer with (2) at least one second monomer having the structural formula IB:

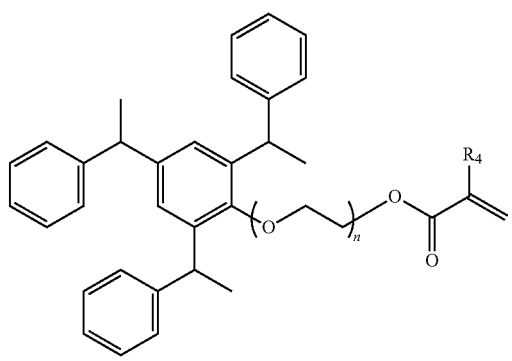

wherein n is in the range of 1-100, $R_4$ is selected from the group consisting of H and $C_1$-$C_8$ alkyl, and wherein the polymer has a glass transition temperature (Tg) of between about −20° C. and about 50° C. and a mean particle size of less than about 200 nm, or a Tg of between about −10° C. and about 10° C. and a mean particle size of less than about 200 nm, or a Tg of between about −5° C. and about 0° C. and a mean particle size of less than about 200 nm, or a Tg of between about −20° C. and about 12° C. and a mean particle size of less than about 190 nm, or a Tg of between about −10° C. and about 10° C. and a mean particle size of less than about 190 nm, or a Tg of between about −10° C. and about 0° C. and a mean particle size of less than about 190 nm, or a Tg of between about −20° C. and about 12° C. and a mean particle size of less than about 175 nm, or a Tg of between about −10° C. and about 10° C. and a mean particle size of less than about 175 nm, or a Tg of between about −10° C. and about 0° C. and a mean particle size of less than about 175 nm.

In still a further aspect, the present invention is a low VOC latex coating composition, comprising: (a) at least one latex polymer; (b) water; and (c) an open time additive in an amount greater than about 1% by weight of the polymer; wherein the open time additive comprises one or a blend of ethoxylated tristyrylphenols having the structural formula IIA:

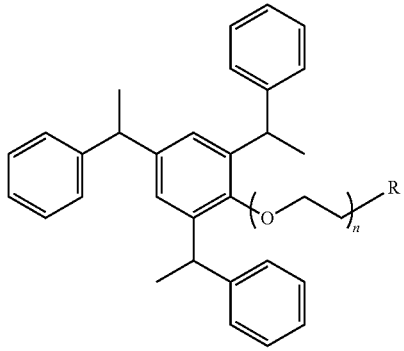

wherein, n is an integer of from 1 to 100, wherein R is —OH, —OCH$_3$, —OC$_2$H$_5$, —OC$_3$H$_7$, —OC$_4$H$_9$, —OC$_5$H$_{11}$, —OC$_6$H$_{13}$, —Cl, —Br, —CN, Phosphonate (—PO$_3^-$M$^+$), Phosphate (PO$_4^-$M$^+$), Sulfate (SO$_4^-$M$^+$), Sulfonate (SO$_3^-$M$^+$), carboxylate (COO$^-$M$^+$), nonionic group, a $C_1$-$C_{12}$ alkyl, hydroxyalkyl, cycloalkyl, aryl or aralkyl, or a quaternary ammonium ion, wherein M+ is a cation including but not limited to H$^+$, Na$^+$, NH$_4^+$, K$^+$, Li$^+$ or —NR$^+_4$. In one embodiment, n is an integer of from about 4 to 80, and in another embodiment from about 1 to 40.

In yet a further aspect, the present invention is a low VOC latex coating composition, comprising: (a) at least one latex polymer; (b) water; and (c) a drying time additive in an amount greater than about 1% by weight of the polymer; wherein the drying time additive comprises one or a blend of ethoxylated tristyrylphenols having the structural formula IIA:

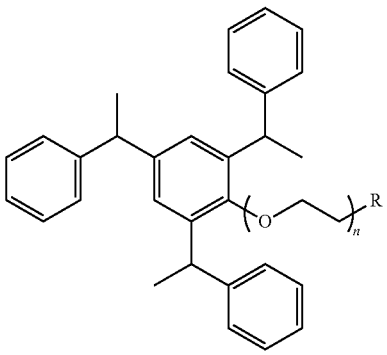

wherein, n is an integer of from 1 to 100, wherein R is —OH, —OCH$_3$, —OC$_2$H$_5$, —OC$_3$H$_7$, —OC$_4$H$_9$, —OC$_5$H$_{11}$, —OC$_6$H$_{13}$, —Cl, —Br, —CN, Phosphonate (—PO$_3^-$M$^+$), Phosphate (PO$_4^-$M$^+$), Sulfate (SO$_4^-$M$^+$), Sulfonate (SO$_3^-$M$^+$), carboxylate (COO$^-$M$^+$), a nonionic group, a C$_1$-C$_{12}$ alkyl, hydroxyalkyl, cycloalkyl, aryl or aralkyl, or a quaternary ammonium ion, wherein M+ is a cation including but not limited to H$^+$, Na$^+$, NH$_4^+$, K$^+$, Li$^+$ or —NR$^+_4$. In one embodiment, n is an integer of from about 4 to 80, and in another embodiment from about 1 to 40.

In one embodiment, the open time and/or drying time additive is present in the latex coating composition in an amount greater than about 0.5% by weight of the polymer. In another embodiment, the open time and/or drying time additive is present in the latex coating composition in an amount greater than about 1% by weight of the polymer. In another embodiment, the open time and/or drying time additive is present in the latex coating composition in an amount greater than about 2% by weight of the polymer. In another embodiment, the additive is present in an amount greater than about 4% by weight of the polymer. In yet another embodiment, the open time and/or drying time additive is present in an amount greater than about 7.5% by weight of the polymer. In a further embodiment, the open time and/or drying time additive is present in an amount greater than about 20% by weight of the polymer. In still a further embodiment, the open time and/or drying time additive is present in an amount between about 1.6% and 7.5% by weight of the polymer.

In one embodiment, the at least one latex monomer in the latex coating composition comprises a glass transition temperature (Tg) of between about −20° C. and about 12° C., typically between about −10° C. and about 10° C., more typically between about −10° C. and about 0° C.

In one embodiment, the at least one latex polymer in the latex coating composition comprises has a mean particle size of less than about 200 nm, typically less than about 190 nm, and more typically less than about 175 nm.

In one embodiment, the latex coating composition is characterized by an open time of greater than about 2 minutes, an open time of greater than about 4 minutes, an open time of greater than about 6 minutes or an open time of greater than about 12 minutes.

In still yet another aspect, the present invention is a latex coating composition, comprising: (a) at least one latex polymer; (b) water; and (c) an open time additive in an amount greater than about 1.6% by weight of the polymer; wherein the open time additive comprises one or a blend of ethoxylated tributylphenols having the structural formula IIB:

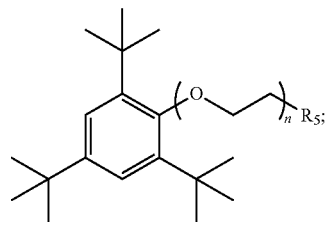

IIB wherein, n is an integer of from 1 to 100, wherein R$_5$ is —OH, —OCH$_3$, —OC$_2$H$_5$, —OC$_3$H$_7$, —OC$_4$H$_9$, —OC$_5$H$_{11}$, —OC$_6$H$_{13}$, —Cl, —Br, —CN, Phosphonate (—PO$_4^-$M$^+$), Phosphate (PO$_4^-$M$^+$), Sulfate (SO$_4^-$M$^+$), Sulfonate (SO$_3^-$M$^+$), carboxylate (COO$^-$M$^+$), a nonionic group, or a quaternary ammonium ion, wherein M+ is a cation including but not limited to H$^+$, Na$^+$, NH$_4^+$, K$^+$, Li$^+$ or —NR$^+_4$. In one embodiment, n is an integer of from about 4 to 80, and in another embodiment from about 1 to 40.

In still yet another aspect, the present invention is a latex coating composition, comprising: (a) at least one latex polymer; (b) water; and (c) a drying time additive in an amount greater than about 1.6% by weight of the polymer; wherein the drying time additive comprises one or a blend of ethoxylated tributylphenols having the structural formula IIB:

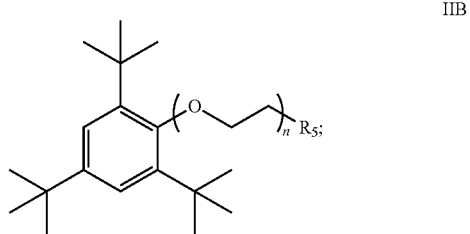

IIB wherein, n is an integer of from 1 to 100, wherein R$_5$ is —OH, —OCH$_3$, —OC$_2$H$_5$, —OC$_3$H$_7$, —OC$_4$H$_9$, —OC$_5$H$_{11}$, —OC$_6$H$_{13}$, —Cl, —Br, —CN, Phosphonate (—PO$_3^-$M$^+$), Phosphate (PO$_4^-$M$^+$), Sulfate (SO$_4^-$M$^+$), Sulfonate (SO$_3^-$M$^+$), carboxylate (COO$^-$M$^+$), a nonionic group, a C$_1$-C$_{12}$ alkyl, hydroxyalkyl, cycloalkyl, aryl or aralkyl, or a quaternary ammonium ion, wherein M+ is a cation including but not limited to H$^+$, Na$^+$, NH$_4^+$, K$^+$, Li$^+$ or —NR$^+_4$. In one embodiment, n is an integer of from about 4 to 80, and in another embodiment from about 1 to 40.

In one embodiment, the open time additive and/or drying time additive is present in the latex coating composition in an amount greater than about 1% by weight of the polymer. In one embodiment, the open time additive and/or drying time additive is present in the latex coating composition in an amount greater than about 2% by weight of the polymer. In another embodiment, the open time additive and/or drying time additive is present in an amount greater than about 4% by weight of the polymer. In yet another embodiment, the open time additive and/or drying time additive is present in an amount greater than about 7.5% by weight of the polymer. In a further embodiment, the open time and/or drying time additive is present in an amount greater than about 20% by weight of the polymer. In still a further embodiment, the open time and/or drying time additive is present in an amount between about 1.6% and 7.5% by weight of the polymer.

In one embodiment, the at least one latex monomer in the latex coating composition comprises a glass transition temperature (Tg) of between about −20° C. and about 12° C., typically between about −10° C. and about 10° C., more typically between about −10° C. and about 0° C.

In one embodiment, the at least one latex monomer in the latex coating composition comprises has a mean particle size of less than about 200 nm, typically less than about 190 nm, and more typically less than about 175 nm.

In one embodiment, the latex coating composition is characterized by an open time of greater than about 2 minutes, an open time of greater than about 4 minutes, an open time of greater than about 6 minutes or an open time of greater than about 12 minutes.

In still yet another aspect, the present invention is a coating composition selected from (i) adhesives, including but not limited to pressure sensitive adhesives, (ii) sealants, (iii) inks, including but not limited to UV inks, conventional inks, hybrid inks, and water-based inks, where composition comprises an open time or drying time additive in an amount greater than about 0.5% by weight of the polymer or composition, and wherein the open time additive comprises one or a blend of ethoxylated tristyrylphenols having the structural formula IIA or IIB:

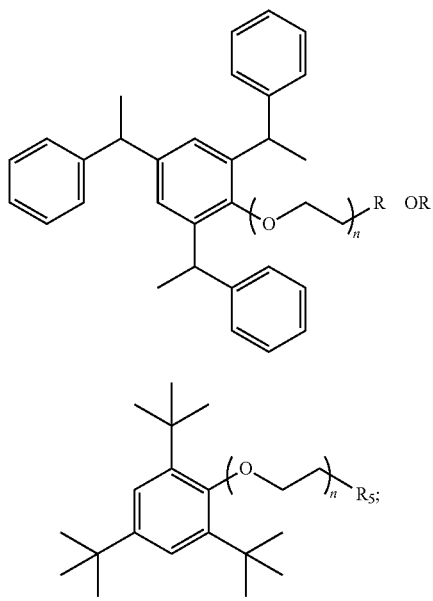

wherein, n is an integer of from 1 to 100, wherein $R_5$ is —OH, —OCH$_3$, —OC$_2$H$_5$, —OC$_3$H$_7$, —OC$_4$H$_9$, —OC$_5$H$_{11}$, —OC$_6$H$_{13}$, —Cl, —Br, —CN, Phosphonate (—PO$_4^-$M$^+$), Phosphate (PO$_4^-$M$^+$), Sulfate (SO$_4^-$M$^+$), Sulfonate (SO$_3^-$M$^+$), carboxylate (COO$^-$M$^+$), a nonionic group, or a quaternary ammonium ion, wherein M+ is a cation including but not limited to H$^+$, Na$^+$, NH$_4^+$, K$^+$, Li$^+$ or —NR$^+_4$. In one embodiment, n is an integer of from about 4 to 80, and in another embodiment from about 1 to 40. In one embodiment, n is an integer of from about 4 to 80, and in another embodiment from about 1 to 40. In another embodiment, $R_5$ is selected from the group consisting of —OH, —OCH$_3$, —OC$_2$H$_5$, —OC$_3$H$_7$, —OC$_4$H$_9$, —OC$_5$H$_{11}$, —OC$_6$H$_{13}$, —Cl, —Br, —CN, Phosphonate (—PO$_3^-$M$^+$), Phosphate (PO$_4^-$M$^+$), Sulfate (SO$_3^-$M$^+$), Sulfonate (SO$_3^-$M$^+$), carboxylate (COO$^-$M$^+$), a nonionic group, a C$_1$-C$_{12}$ alkyl group, a C$_1$-C$_{12}$ hydroxyalkyl group, a C$_1$-C$_{12}$ cycloalkyl group, a C$_1$-C$_{12}$ aryl group, a C$_1$-C$_{12}$ aralkyl group and a quaternary ammonium ion, wherein M+ is a cation including but not limited to H$^+$, Na$^+$, NH$_4^+$, K$^+$, Li$^+$ or —NR$^+_4$.

In one embodiment, the open time additive is present in an amount greater than 1% by weight of the polymer or composition. In one embodiment, the open time additive is present in an amount greater or 1.6% by weight of the polymer or composition.

In one embodiment, the open time additive and/or drying time additive is present in the composition in an amount greater than about 2% of the polymer or composition.

In one embodiment, the open time additive and/or drying time additive is present in the latex coating composition in an amount greater than about 2.5% by weight of the polymer or composition. In another embodiment, the open time additive and/or drying time additive is present in an amount greater than about 4% by weight of the polymer or composition. In yet another embodiment, the open time additive and/or drying time additive is present in an amount greater than about 7.5% by weight of the polymer or composition. In a further embodiment, the open time and/or drying time additive is present in an amount greater than about 20% by weight of the polymer or composition. In still a further embodiment, the open time and/or drying time additive is present in an amount between about 1.6% and 7.5% by weight of the polymer or composition.

In one embodiment, the at least one latex monomer in the latex coating composition comprises a glass transition temperature (Tg) of between about −20° C. and about 12° C., typically between about −10° C. and about 10° C., more typically between about −10° C. and about 0° C.

In another embodiment, the at least one latex monomer in the latex coating composition has a Tg of between about −20° C. and about 50° C., typically between about −10° C. and about 40° C., more typically between about −10° C. and about 30° C., typically between about −10° C. and about 20° C., more typically between about −10° C. and about 10° C.

In one embodiment, the at least one latex monomer in the latex coating composition comprises has a mean particle size of less than about 200 nm, in one embodiment less than about 190 nm, in one embodiment less than about 175 nm, in one embodiment less than 150 nm, in one embodiment less than 135 nm, in another embodiment less than about 120 nm. In one embodiment, the at least one latex monomer in the latex coating composition comprises has a mean particle size of less than about 100 nm.

In one embodiment, the composition is characterized by an open time of greater than about 2 minutes, an open time of greater than about 4 minutes, an open time of greater than about 6 minutes or an open time of greater than about 12 minutes.

These and other features and advantages of the present invention will become more readily apparent to those skilled in the art upon consideration of the following detailed description, which describe both the preferred and alternative embodiments of the present invention.

BRIEF DESCRIPTION OF DRAWINGS

FIG. 1 is a chart illustrating the open time measurement of a latex using Multispeckle Diffusing-Wave Spectroscopy (MS-DWS).

DETAILED DESCRIPTION OF THE PREFERRED EMBODIMENTS

The present invention relates to the use of a particular family of alkoxylated compounds, e.g., alkoxylated tristyrylphenols and alkoxylated tributylphenols, provided with an ethylene oxide chain for improving open time of latex binders, paints, adhesives and the like. This family of alkoxylated compounds can improve other properties as well, for example, wet edge, stain resistance, open time, film gloss, dispersibility, hiding and scrub resistance, low temperature film formation, foam resistance, block resistance, adhesion and water sensitivity, among others.

As used herein, the term "alkyl" means a saturated hydrocarbon radical, which may be straight, branched or cyclic, such as, for example, methyl, ethyl, n-propyl, iso-propyl, n-butyl, sec-butyl, t-butyl, pentyl, n-hexyl, cyclohexyl.

As used herein, the term "cycloalkyl" means a saturated hydrocarbon radical that includes one or more cyclic alkyl rings, such as, for example, cyclopentyl, cyclooctyl, and adamantanyl.

As used herein, the term "hydroxyalkyl" means an alkyl radical, more typically an alkyl radical, that is substituted with a hydroxyl groups, such as for example, hydroxymethyl, hydroxyethyl, hydroxypropyl, and hydroxydecyl.

As used herein, the term "alkylene" means a bivalent acyclic saturated hydrocarbon radical, including but not limited to methylene, polymethylene, and alkyl substituted polymethylene radicals, such as, for example, dimethylene, tetramethylene, and 2-methyltrimethylene.

As used herein, the term "alkenyl" means an unsaturated straight chain, branched chain, or cyclic hydrocarbon radical that contains one or more carbon-carbon double bonds, such as, for example, ethenyl, 1-propenyl, 2-propenyl.

As used herein, the term "aryl" means a monovalent unsaturated hydrocarbon radical containing one or more six-membered carbon rings in which the unsaturation may be represented by three conjugated double bonds, which may be substituted one or more of carbons of the ring with hydroxy, alkyl, alkenyl, halo, haloalkyl, or amino, such as, for example, phenoxy, phenyl, methylphenyl, dimethylphenyl, trimethylphenyl, chlorophenyl, trichloromethylphenyl, aminophenyl.

As used herein, the term "aralkyl" means an alkyl group substituted with one or more aryl groups, such as, for example, phenylmethyl, phenylethyl, triphenylmethyl.

As used herein, the terminology "($C_n$-$C_m$)" in reference to an organic group, wherein n and m are each integers, indicates that the group may contain from n carbon atoms to m carbon atoms per group.

As used herein, the terminology "ethylenic unsaturation" means a terminal (that is, e.g., $\alpha$, $\beta$) carbon-carbon double bond.

In one embodiment, the present invention includes latex polymers and latex dispersions having low-VOC content and improved open time properties compared to conventional aqueous coating compositions, as well as methods of use. Such latex polymers can include at least one latex polymer copolymerized or blended with a particular family of alkoxylated compounds. Typically the latex has a Tg of less than 20° C., more typically less than 15° C., still more typically less than 5° C. More typically, the latex has a Tg in the range of from about −20° C. to about 12° C., more typically from about −10° C. to about 10° C., more typically in the range from −10° C. to about 0° C. In one embodiment, the latex polymer of the present invention has a weight average molecular weight of from about 1,000 to 5,000,000, typically 5,000 to 2,000,000. In another embodiment, the latex polymer of the present invention has a weight average molecular weight of from about 10,000 to 250,000.

Without being bound by theory, it is believed the large hydrophobic groups adsorbed or grafted onto the latex particles or co-polymerized into the latex particles prevent these latex particles from approaching the surfaces of other latex particles and increase the distance of separation between latex particles. It is believed that in the water evaporation process, steric repulsion may prevent the latex particles packing which are driven by the capillary forces. This in turn improves the open time of aqueous coatings. Without being bound by theory, it is also believed that the method of incorporating hydrophilic moiety into or onto latex particles of waterborne coatings and paints can keep water molecules between the latex particles and the interactions between hydrophilic moiety and water retain the water for a longer period time. Without being bound by theory, it is believed that the method of adding the open time additive of the present invention to aqueous coatings can generate a hydrophobic monolayer at the air-water interface that can prevent the evaporation of water from the aqueous systems.

The present invention provides aqueous compositions, for example, aqueous coating compositions, as well as adhesives, including but not limited to pressure sensitive adhesives, glues, resins, sealants, inks, including but not limited to UV inks, conventional inks, hybrid inks, and water-based inks having excellent open time, as well as wet edge properties and drying time properties compared to conventional compositions. In one embodiment, the aqueous compositions of the invention are aqueous polymer dispersions which include at least one latex polymer copolymerized or blended with a particular family of alkoxylated compounds, e.g., alkoxylated tristyrylphenol. Generally, the latex polymer is present in such aqueous compositions or paints from about 15% to about 40% by weight of the composition for semigloss and from about 5% to up to about 75%, typically about 5% to about 50% by weight of the composition for flat paint. Paints or other aqueous coatings of the present invention typically further include at least one pigment. Other aqueous coatings of the present invention such as adhesives typically do not need a pigment.

The members of the particular family of alkoxylated compounds, e.g., alkoxylated tristyrylphenols and/or tributylphenols, can be employed in a number of ways for improving open time and wet edge of latex binders, paints, adhesives, including but not limited to pressure sensitive adhesives, glues, resins, sealants, inks, including but not limited to UV inks, conventional inks, hybrid inks, and water-based inks. The present invention may employ one or any combination of (i) polymerizable reactive alkoxylated monomers to form a latex comonomer, (ii) surface active alkoxylated compounds as a surfactant (emulsifier) to be present during latex polymer formation, and/or (iii) surface active alkoxylated compounds as an additive to an aqueous dispersion of latex polymer or copolymer.

Reactive Polymerizable Tristyrylphenol Ethoxylates

In one embodiment, polymerizable reactive alkoxylated (second) monomer of the following formula IA can be copolymerized (with a first monomer) into the backbone of the latex polymer.

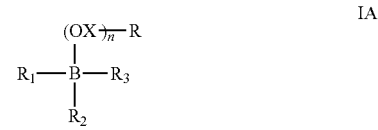

IA wherein B is a 5 or 6 membered cycloalkyl ring, e.g., a cyclohexyl ring, or a single ring aromatic hydrocarbon having a 6 membered ring, e.g., a benzene ring;

R1, R2 and R3 are independently selected from:

a $C_1$-$C_{18}$ alkyl, hydroxyalkyl, cycloalkyl, aryl or aralkyl, —H, butyl, tert-butyl, isobutyl,

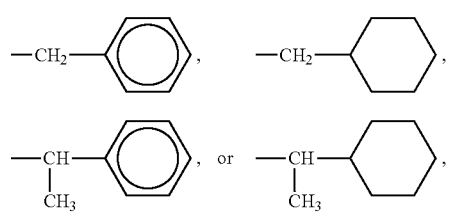

with the proviso that one or none of $R_1$, $R_2$ and $R_3$ is —H.

wherein, X is $C_2H_4$, $C_3H_6$, or $C_4H_8$, or X is a divalent hydrocarbon radical selected from linear or branched alkylene radicals having from 2 to 8 carbon atoms; n is an integer of from 1 to 100, for example from about 4 to 80 or 8 to 60; wherein R is an ethylenically unsaturated group. In one embodiment, n is an integer of from 4 to 80. In one embodiment, n is an integer of from 4 to 60. In one embodiment, n is an integer of from 10 to 60. In one embodiment, n is an integer of from 10 to 50.

Typically, R includes acrylate, or $C_1$-$C_6$ alkyl acrylate, e.g., methacrylate, allyl, vinyl, maleate, itaconate or fumarate, typically R is acrylate or methacrylate.

Suitable polymerizable functional groups R include, for example, acrylo, methacrylo, acrylamido, methacrylamido, diallylamino, allyl ether, vinyl ether, α-alkenyl, maleimido, styrenyl, and α-alkyl styrenyl groups.

For example, suitable polymerizable functional groups R have the chemical structure: $R^aCH\!=\!C(R^b)COO\!-\!$, wherein if $R^a$ is H, then $R^b$ is H, $C_1$-$C_4$ alkyl, or $-CH_2COOX$; if $R^a$ is $-C(O)OX$, then $R^b$ is H or $-CH_2C(O)OX^a$; or if $R^a$ is $CH_3$, then $R^b$ is H and $X^a$ is H or $C_1$-$C_4$ alkyl.

For example, other suitable polymerizable functional groups R have the chemical structure: $-HC\!=\!CYZ$ or $-OCH\!=\!CYZ$, wherein Y is H, $CH_3$, or Cl; Z is CN, Cl, $-COOR^c$, $-C_6H_4R^e$, $-COOR^d$, or $-HC\!=\!CH_2$; $R^d$ is $C_1$-$C_8$ alkyl or $C_2$-$C_8$ hydroxy alkyl; $R^e$ is H, Cl, Br, or $C_1$-$C_4$ alkyl.

Typically the monomer has the formula IB:

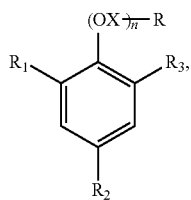

IB wherein, R, $R_1$, $R_2$, $R_3$, X and n are as defined for the structure of formula IA. If desired, the aromatic ring shown in structural formula IB may be saturated. For example, such a saturated monomer may be made by saturating a form of the monomer wherein H is in the R position and then replacing the H in the R position with one of the other above-listed R groups.

In one embodiment, at least one monomer can be copolymerized with a second monomer having structure IB-1:

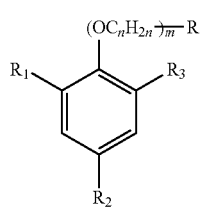

IB-1 wherein R is

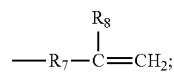

$R_1$, $R_2$ and $R_3$ are each independently H, branched ($C_3$-$C_8$ alkyl), branched ($C_4$-$C_8$) alkene or $R_5\!-\!R_6\!-\!$;
$R_5$ is aryl or ($C_6$-$C_8$) cycloalkyl,
$R_6$ is ($C_1$-$C_6$) alkylene,
$R_7$ is a divalent linking group, 0, ($C_1$-$C_6$) alkylene,

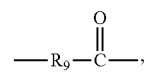

or absent,
$R_8$ is H or methyl,
$R_9$ is O or $NR_{10}$,
$R_{10}$ is H or ($C_1$-$C_4$) alkyl; n is an integer of from 2 to 4, and m is an integer of from 1 to 100.

In one embodiment, $R_1$, $R_2$ and $R_3$ are independently selected from:
a $C_1$-$C_{18}$ alkyl, hydroxyalkyl, cycloalkyl, aryl or aralkyl, $-H$, butyl, tert-butyl, isobutyl,

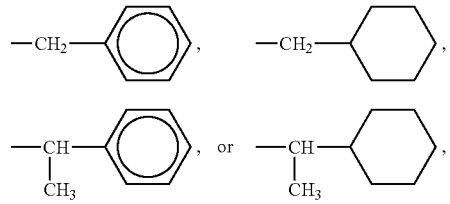

In one embodiment, R can be acrylate, $C_1$-$C_6$ alkyl acrylate, allyl, vinyl, maleate, itaconate or fumarate. In one embodiment, R is at least one of acrylo, methacrylo, acrylamido, methacrylamido, diallylamino, allyl ether, vinyl ether, α-alkenyl, maleimido, styrenyl, and/or α-alkyl styrenyl groups.

In another embodiment, the second monomer is an ethoxylated tributylphenol. In another embodiment, the monomer is an ethoxylated tristyrylphenol. The polymerizable reactive ethoxylated tristyrylphenols have the structural formula IC and the polymerizable reactive ethoxylated tributylphenols have the structural formula IC-1, respectively, as follows:

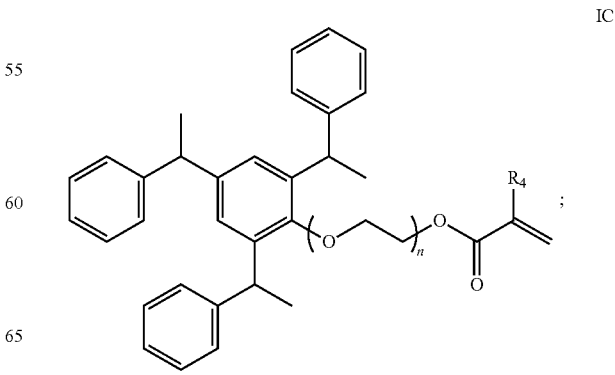

IC

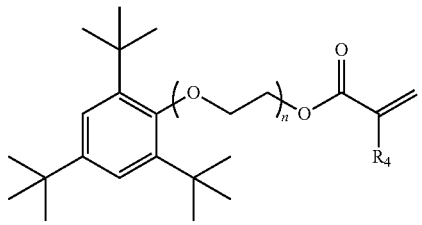

wherein, n is an integer of from 1-100, for example, 4 to 80 or 8 to 25;

$R_4$ is a member of the group H, $C_1$-$C_8$ hydroxy alkyl, $C_1$-$C_6$ alkyl, for example, $CH_3$ or $C_2H_5$.

Thus, the reactive polymerizable ethoxylated tristyrylphenol monomer has a tristyrylphenol portion, an alkylene oxide portion and a reactive substituted or unsubstituted acrylic end group for polymerization. Likewise, the reactive polymerizable ethoxylated tributylphenol monomer has a tributylphenol portion, an alkylene oxide portion and a reactive substituted or unsubstituted acrylic end group for polymerization. If desired, the ethylene oxide group shown in structural formula IC or IC-1 may be replaced with the above discussed —(OX)— group to form an alkoxylated tristyrylphenol or tributylphenol, respectively, and the —C(O)—$CHR_4CH_2$ end group may be replaced by allyl, vinyl, maleate, itaconate or fumarate.

Tristyrylphenol ethoxylates, for other uses, are disclosed by U.S. Pat. No. 6,146,570, published PCT patent application number WO 98/012921 and WO 98/045212, incorporated herein by reference.

If desired the aromatic rings of the styryl groups in Formula IC may be saturated.

When reactive polymerizable alkoxylated monomer of IA, IB, IC and/or IC-1 is copolymerized into the backbone of the latex polymer, the latex polymer is made from a mixture wherein the reactive tristyrylphenol or tributylphenol monomer is 1 to 20 parts per 100 parts by weight of monomers used to form the copolymer, more typically 2 to 15, 2 to 8, or 2 to 6 parts per 100 parts by weight of monomers used to form the copolymer. In one embodiment, both the reactive polymerizable alkoxylated monomer of formula IC and IC-1 are utilized and copolymerized into the backbone of a latex polymer.

Other Monomers

In addition to the polymerizable tristyrylphenol monomer and/or polymerizable tributylphenol monomer, there are other monomers from which the at least one latex polymer used in the aqueous coating composition, e.g., paint, is typically derived. For purposes of this description, these other monomers from which latex polymers may be derived are termed latex monomers. Typically, these other latex monomers comprise at least one acrylic monomer selected from the group consisting of acrylic acid, acrylic acid esters, methacrylic acid, and methacrylic acid esters. In addition, the other monomers for making the latex polymer can optionally be selected from one or more monomers selected from the group consisting of styrene, a-methyl styrene, vinyl chloride, acrylonitrile, methacrylonitrile, ureido methacrylate, vinyl acetate, vinyl esters of branched tertiary monocarboxylic acids (e.g. vinyl esters commercially available under the mark VEOVA from Shell Chemical Company or sold as EXXAR Neo Vinyl Esters by ExxonMobil Chemical Company), itaconic acid, crotonic acid, maleic acid, fumaric acid, and ethylene. It is also possible to include $C_4$-$C_8$ conjugated dienes such as 1,3-butadiene, isoprene and chloroprene. Typically, the monomers include one or more monomers selected from the group consisting of n-butyl acrylate, methyl methacrylate, styrene and 2-ethylhexyl acrylate. The latex polymer is typically selected from the group consisting of pure acrylics (comprising acrylic acid, methacrylic acid, an acrylate ester, and/or a methacrylate ester as the main monomers); styrene acrylics (comprising styrene and acrylic acid, methacrylic acid, an acrylate ester, and/or a methacrylate ester as the main monomers); vinyl acrylics (comprising vinyl acetate and acrylic acid, methacrylic acid, an acrylate ester, and/or a methacrylate ester as the main monomers); and acrylated ethylene vinyl acetate copolymers (comprising ethylene, vinyl acetate and acrylic acid, methacrylic acid, an acrylate ester, and/or a methacrylate ester as the main monomers). The monomers can also include other main monomers such as acrylamide and acrylonitrile, and one or more functional monomers such as itaconic acid and ureido methacrylate, as would be readily understood by those skilled in the art. In a particularly preferred embodiment, the latex polymer is a pure acrylic such as a butyl acrylate/methyl methacrylate copolymer derived from monomers including butyl acrylate and methyl methacrylate.

In one embodiment, the reactive polymerizable alkoxylated monomer of formula IA, IB, IC and/or IC-1 are utilized and copolymerized with one of the monomers listed under "other monomers" into the backbone of a latex polymer under reaction conditions. In another embodiment, the reactive polymerizable alkoxylated monomer of formula IA, IB, IC and/or IC-1 are utilized and copolymerized with two or more of the monomers listed under "other monomers" into the backbone of a latex polymer under reaction conditions. In another embodiment, one or more reactive polymerizable alkoxylated monomers of formula IA, IB, IC and/or IC-1 are utilized and copolymerized with one or more of the monomers listed under "other monomers" into the backbone of a latex polymer under reaction conditions.

The latex polymer dispersion typically includes from about 30 to about 75% solids and a mean latex particle size of from about 70 to about 650 nm. In another embodiment, the polymer of the present invention has a mean particle size of less than about 400 nm, typically a mean particle size of less than about 200 nm, more typically a mean particle size of less than about 190 nm, and most typically a mean particle size of less than about 175 nm. In another embodiment, the polymer has a mean particle size of from about 75 nm to about 400 nm.

The latex polymer is typically present in the aqueous coating composition in an amount from about 5 to about 60 percent by weight, and more typically from about 8 to about 40 percent by weight (i.e. the weight percentage of the dry latex polymer based on the total weight of the coating composition).

The resulting aqueous coating composition containing the polymer of the present invention has improved open time characteristics without having to add open time additives, or adding small amounts of solvents, as described above. Therefore, aqueous coating compositions can be produced in accordance with the invention that possess lower VOC levels than conventional aqueous coating compositions and thus that are more environmentally desirable.

In another embodiment, the resulting latex polymer may be incorporated into an aqueous coating composition along with an emulsion surfactant of the present invention as described below and/or the open time additive of the present invention as described below. The addition of the open time additive has little or no effect on the VOC levels of the aqueous coating composition, and, thus, aqueous coating compositions can be produced in that possess lower VOC levels than conventional aqueous coating compositions. In such an embodiment, the latex coating composition contains an open time additive as described herein in an amount greater than about 1.3% by weight of the polymer. In another embodiment, the latex coating composition contains a open time additive as described herein in an amount greater than about 1.6% by weight of the polymer. In another embodiment, the latex coating composition contains an open time additive as described herein in an amount greater than about 2% by weight of the polymer. In another embodiment, the latex coating composition contains an open time additive as described herein in an amount greater than about 4% by weight of the polymer. In another embodiment, the latex coating composition contains an open time additive as described herein in an amount greater than about 7.5% by weight of the polymer. In another embodiment, the latex coating composition contains an open time additive as described herein in an amount greater than about 8% by weight of the polymer. In another embodiment, the latex coating composition contains an open time additive in an amount between about 1.6% and 7.5% by weight of the polymer. In another embodiment, the latex coating composition contains an open time additive in an amount between about 1.6% and 45% by weight of the polymer, typically between about 1.6% and 35% by weight of the polymer.

In a further embodiment, the polymer of the present invention is characterized by improved open time characteristics, and can have a Tg of between about −20° C. and about 12° C. and a mean particle size of less than about 200 nm, or a Tg of between about −10° C. and about 10° C. and a mean particle size of less than about 200 nm, or a Tg of between about −10° C. and about 0° C. and a mean particle size of less than about 200 nm, or a Tg of between about −20° C. and about 12° C. and a mean particle size of less than about 190 nm, or a Tg of between about −10° C. and about 10° C. and a mean particle size of less than about 190 nm, or a Tg of between about −10° C. and about 0° C. and a mean particle size of less than about 190 nm, or a Tg of between about −20° C. and about 12° C. and a mean particle size of less than about 175 nm, or a Tg of between about −10° C. and about 10° C. and a mean particle size of less than about 175 nm, or a Tg of between about −10° C. and about 0° C. and a mean particle size of less than about 175 nm The latex polymer including the reactive polymerizable alkoxylated monomer of formula IA, IB or IC can be used in combination with other ionic or non-ionic type of surfactants that are either polymerizable or non-polymerizable, in the aqueous coating composition. In particular, the polymer latex binder can be prepared using emulsion polymerization by feeding the monomers used to form the latex binder to a reactor in the presence of at least one initiator and the at least one reactive polymerizable alkoxylated monomer of formula IA, IB, IC or IC-1 and polymerizing the monomers to produce the latex binder. The monomers fed to a reactor to prepare the polymer latex binder typically include at least one acrylic monomer selected from the group consisting of acrylic acid, acrylic acid esters, methacrylic acid, and methacrylic acid esters. In addition, the monomers can include styrene, vinyl acetate, or ethylene. The monomers can also include one or more monomers selected from the group consisting of styrene, [alpha]-methyl styrene, vinyl chloride, acrylonitrile, methacrylonitrile, ureido methacrylate, vinyl acetate, vinyl esters of branched tertiary monocarboxylic acids, itaconic acid, crotonic acid, maleic acid, fumaric acid, and ethylene. It is also possible to include C4-C8 conjugated dienes such as 1,3-butadiene, isoprene or chloroprene. Typically, the monomers include one or more monomers selected from the group consisting of n-butyl acrylate, methyl methacrylate, styrene and 2-ethylhexyl acrylate. The initiator can be any initiator known in the art for use in emulsion polymerization such as ammonium or potassium persulfate, or a redox system that typically includes an oxidant and a reducing agent. Commonly used redox initiation systems are described e.g., by A. S. Sarac in Progress in Polymer Science 24 (1999), 1149-1204.

The polymer latex binder can be produced by first preparing an initiator solution comprising the initiator and water. A monomer pre-emulsion is also prepared comprising at least a portion of the monomers to be used to form the latex polymer, one or more surfactants (emulsifiers), water, and additional additives such as NaOH. The one or more surfactants in the monomer pre-emulsion include any of the reactive polymerizable alkoxylated monomers of the present invention. The initiator solution and monomer pre-emulsion are then continuously added to the reactor over a predetermined period of time (e.g. 1.5-5 hours) to cause polymerization of the monomers and to thereby produce the latex polymer. Typically, at least a portion of the initiator solution is added to the reactor prior to adding the monomer pre-emulsion. Prior to the addition of the initiator solution and the monomer pre-emulsion, a seed latex such as a polystyrene seed latex can be added to the reactor. In addition, water, one or more surfactants, and any monomers not provided in the monomer pre-emulsion can be added to the reactor prior to adding the initiator and adding the monomer pre-emulsion. The reactor is operated at an elevated temperature at least until all the monomers are fed to produce the polymer latex binder. Once the polymer latex binder is prepared, it is typically chemically stripped thereby decreasing its residual monomer content. Typically, it is chemically stripped by continuously adding an oxidant such as a peroxide (e.g. t-butylhydroperoxide) and a reducing agent (e.g. sodium acetone bisulfite), or another redox pair such as those described by A. S. Sarac in Progress in Polymer Science 24(1999), 1149-1204, to the latex binder at an elevated temperature and for a predetermined period of time (e.g. 0.5 hours). The pH of the latex binder can then be adjusted and a biocide or other additives added after the chemical stripping step.

The aqueous coating composition is a stable fluid that can be applied to a wide variety of materials such as, for example, paper, wood, concrete, metal, glass, ceramics, plastics, plaster, and roofing substrates such as asphaltic coatings, roofing felts, foamed polyurethane insulation; or to previously painted, primed, undercoated, worn, or weathered substrates. The aqueous coating composition of the invention can be applied to the materials by a variety of techniques well known in the art such as, for example, brush, rollers, mops, air-assisted or airless spray, electrostatic spray, and the like.

Latex Polymer Compositions Comprising Surface Active (Emulsifier) Compound

In another embodiment a surface active compound of structural formula IIA can be used as an emulsifier during the emulsion polymerization reaction used to make latex polymer.

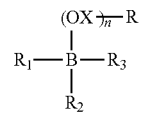

IIA wherein B is a 5 or 6 membered cycloalkyl ring, e.g., a cyclohexyl ring, or a single ring aromatic hydrocarbon having a 6 membered ring, e.g., a benzene ring;

$R_1$, $R_2$ and $R_3$ are independently selected from:

a $C_1$-$C_{18}$ alkyl, hydroxyalkyl, cycloalkyl, aryl or aralkyl, —H, tertbutyl, butyl,

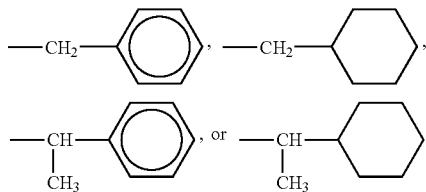

with the proviso that one or none of $R_1$, $R_2$ and $R_3$ is —H.

wherein, X is at least one member of the group consisting of $C_2H_4$, $C_3H_6$, and $C_4H_8$, or wherein X is a divalent hydrocarbon radical selected from linear or branched alkylene radicals having from 2 to 8 carbon atoms; n is 1-100, for example, 3 to 80, 4 to 60, 4 to 60 or 8 to 50;

wherein R is —OH, —OCH$_3$, —OC$_2$H$_5$, —OC$_3$H$_7$, —OC$_4$H$_9$, —OC$_5$H$_{11}$, —OC$_6$H$_{13}$, —Cl, —Br, —CN, Phosphonate (—PO$_3^-$M$^+$), Phosphate (PO$_4^-$M$^+$), Sulfate (SO$_4^-$M$^+$), Sulfonate (SO$_3^-$M$^+$), carboxylate (COO$^-$M$^+$), a nonionic group, a $C_1$-$C_{12}$ alkyl, hydroxyalkyl, cycloalkyl, aryl or aralkyl, or a quaternary ammonium ion, wherein M+ is a cation including but not limited to H$^+$, Na$^+$, NH$_4^+$, K$^+$ or Li$^+$, In one embodiment, $R_5$ is selected from a quaternary ammonium ion:

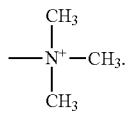

In one embodiment, n is an integer of from 4 to 80. In one embodiment, n is an integer of from 4 to 60. In one embodiment n is an integer of from 4 to 50. In one embodiment, n is an integer of from 8 to 50.

Typically the alkoxylated surface active compound has the formula IIB:

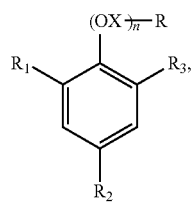

wherein, R, $R_1$, $R_2$, $R_3$, X and n are as defined for the structure of formula IIA. If desired, the aromatic ring shown in structural formula IIB may be saturated.

More typically a surface active alkoxylated tristyrylphenol, e.g., ethoxylated tristyrylphenol, or a surface active alkoxylated tributylphenol, e.g., ethoxylated tributylphenol can be used as an emulsifier during the emulsion polymerization reaction used to make latex polymer. The surface active ethoxylated tristyrylphenols have the structural formula IIC and the surface active ethoxylated tributylphenols have the structural formula IIC-1, respectively, as follows:

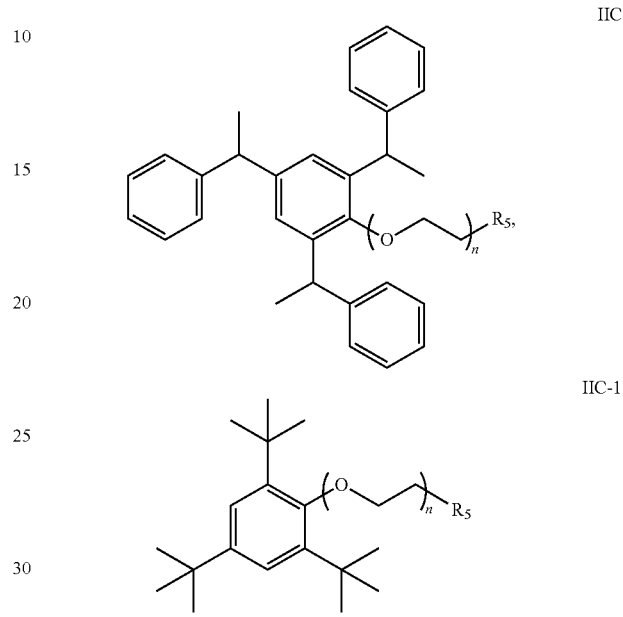

wherein, n is an integer of from 1 to 100 for example, 4 to 60 or 8 to 25, wherein $R_5$ is —OH, —OCH$_3$, —OC$_2$H$_5$, —OC$_3$H$_7$, —OC$_4$H$_9$, —OC$_5$H$_{11}$, —OC$_6$H$_{13}$, —Cl, —Br, —CN, Phosphonate (—PO$_3^-$M$^+$), Phosphate (PO$_4^-$M$^+$), Sulfate (SO$_4^-$M$^+$), Sulfonate (SO$_3^-$M$^+$), carboxylate (COO$^-$M$^+$), a nonionic group, a $C_1$-$C_{12}$ alkyl, hydroxyalkyl, cycloalkyl, aryl or aralkyl, or a quaternary ammonium ion, wherein M+ is a cation including but not limited to H$^+$, Na$^+$, NH$_4^+$, K$^+$, Li$^+$ or —NR$^+_4$ In one embodiment, $R_5$ is selected from a quaternary ammonium ion:

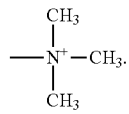

In one embodiment, n is an integer of from 4 to 80. In one embodiment, n is an integer of from 4 to 60. In one embodiment, n is an integer of from 10 to 50. In one embodiment, n is an integer of from 10 to 25.

When surface active ethoxylated tristyrylphenol or ethoxylated tributylphenol is employed as an emulsifier in emulsion polymerization to form the latex polymer, the latex polymer is made from a mixture wherein the surface active emulsifier is utilized. In one embodiment, the emulsifier is added in an amount greater than 1.3% by weight of the polymer or monomers used to form the latex polymer, in an amount greater than 1.6% by weight of the polymer or monomers used to form the latex polymer, typically in an amount greater than about 2% by weight of the polymer or monomers used to form the latex polymer, more typically in an amount greater than about 4% by weight of the polymer or monomers used to form the latex polymer, and most typically in an amount greater than about 7.5% by weight of the polymer or monomers used to form the latex polymer. In another embodiment, the latex coating composition contains an emulsifier in an amount greater than about 8% by weight of the polymer or monomers used to form the latex polymer, or greater than about 10% by weight of the polymer or monomers. In another embodiment, the emulsifier is added is between about 1.6% and 7.5% by weight of the polymer or monomers used to form the latex polymer. In another embodiment, emulsifier added is between about 1.6% and 45% by weight of the polymer or monomers used to form the latex polymer, typically between about 1.6% and 35% by weight of the polymer or monomers used to form the latex polymer If desired the ethylene oxide repeating units of the ethylene oxide chain of formula IIC or IIC-1 may be replace by the above-described —(OX)— group to form alkoxylated tristyrylphenol or alkoxylated tributylphenol.

The typical monomers from which the at least one latex polymer (sometimes referred to herein as first monomer or third monomer) is formed are described above in the section entitled "Other Monomers".

As described above, the polymer latex binder can be produced by first preparing an initiator solution comprising the initiator and water. A monomer pre-emulsion is also prepared comprising at least a portion of the monomers to be used to form the latex polymer, one or more surfactants (emulsifiers), water, and additional additives such as NaOH. The one or more surfactants in the monomer pre-emulsion include the surface active alkoxylated compound of the invention. Thus, the alkoxylated compound is employed as an emulsifier to form a blend rather than as a reactant which copolymerizes with the other monomers which form the polymer latex binder. The initiator solution and monomer pre-emulsion are then continuously added to the reactor over a predetermined period of time (e.g. 1.5-5 hours) to cause polymerization of the monomers and to thereby produce the latex polymer. Typically, at least a portion of the initiator solution is added to the reactor prior to adding the monomer pre-emulsion. Prior to the addition of the initiator solution and the monomer pre-emulsion, a seed latex such as a polystyrene seed latex can be added to the reactor. In addition, water, one or more surfactants, and any monomers not provided in the monomer pre-emulsion can be added to the reactor prior to adding the initiator and adding the monomer pre-emulsion. The reactor is operated at an elevated temperature at least until all the monomers are fed to produce the polymer latex binder. Once the polymer latex binder is prepared, it is typically chemically stripped thereby decreasing its residual monomer content. Typically, it is chemically stripped by continuously adding an oxidant such as a peroxide (e.g. t-butylhydroperoxide) and a reducing agent (e.g. sodium acetone bisulfite), or another redox pair such as those described by A. S. Sarac in Progress in Polymer Science 24(1999), 1149-1204, to the latex binder at an elevated temperature and for a predetermined period of time (e.g. 0.5 hours). The pH of the latex binder can then be adjusted and a biocide or other additives added after the chemical stripping step.

The incorporation of the surface active alkoxylated compound surfactant (emulsifier) in the emulsion polymerization reaction mixture enables the coating composition to have a lower VOC content while extending or lengthening the open time of the aqueous coating composition to a period greater than about 4 minutes, typically greater than about 6 minutes, more typically greater than about 8 minutes.

Additive

In another embodiment the above-described surface active alkoxylated compound of structural formula IIA, IIB, IIC or IIC-1 (sometimes referred to as the open time additive or wet edge additive) can be used as an open time additive to coatings including but not limited to architectural or industrial paint; adhesives, including but not limited to pressure sensitive adhesives; glues; resins; sealants; inks, including but not limited to UV inks, conventional inks, hybrid inks, and water-based inks. In one particular embodiment, the above-described surface active alkoxylated compound of structural formula IIA, IIB, IIC or IIC-1 can be used as an open time additive to an already formed aqueous dispersion of latex polymer. It is understood, that the open time additive can be added any point in the production of the composition, including but not limited to during the emulsification step, during formulation, etc. It is also understood that the open time additive can be post-added to the coatings including but not limited to architectural or industrial paint; adhesives, including but not limited to pressure sensitive adhesives; glues; resins; sealants; inks, including but not limited to UV inks, conventional inks, hybrid inks, and water-based inks; as well as to a concentrate thereof.

In yet another embodiment the above-described surface active alkoxylated compound of structural formula IIA, IIB, IIC or IIC-1 (sometimes referred to as drying time additive) can be used as a drying time additive to coatings including but not limited to architectural or industrial paint; adhesives, including but not limited to pressure sensitive adhesives; glues; resins; sealants; inks, including but not limited to UV inks, conventional inks, hybrid inks, and water-based inks. In one particular embodiment, the above-described surface active alkoxylated compound of structural formula IIA, IIB, IIC or IIC-1 can be used as an drying time additive to an already formed aqueous dispersion of latex polymer. It is understood, that the drying time additive can be added any point in the production of the aqueous coating composition, including but not limited to during the emulsification step, during formulation, etc. It is also understood that the drying time additive can be post-added to the coatings including but not limited to architectural or industrial paint; adhesives, including but not limited to pressure sensitive adhesives; glues; resins; sealants; inks, including but not limited to UV inks, conventional inks, hybrid inks, and water-based inks; as well as to a concentrate thereof.

In one embodiment, this results in an aqueous composition comprising the surface active alkoxylated compound. When the surface active alkoxylated compound is employed as an additive to an already formed aqueous latex dispersion, the resulting composition has alkoxylated compound additive in an amount of about 1 to 10, Typically 2 to 8 or 2 to 6, parts per 100 parts by weight of monomers used to form the latex polymer.

The typical monomers from which the latex polymer is formed are described above in the section entitled "Other Monomers" and can be copolymerized with the reactive monomers of the present invention as described above.

In one embodiment, the open time and/or drying time additive comprises a blend of two or more surface active alkoxylated compounds each of structural formula IIA, IIB, IIC or IIC-1. In another embodiment, the open time and/or drying time additive comprises a blend of:

(i) At Least One Non-Ionic Surfactant Having Structural Formula:

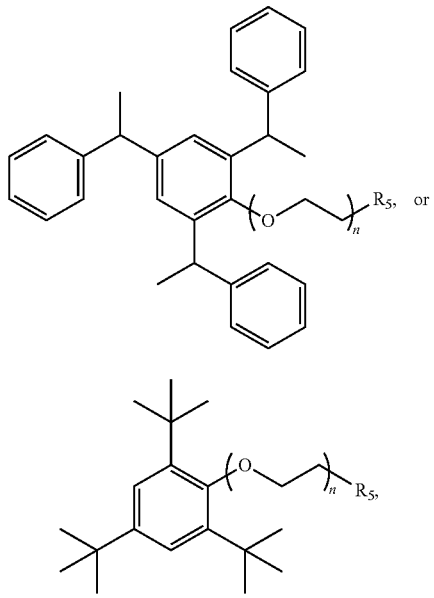

IIIA-1

IIIB-1 wherein, n is an integer of from 1 to 100, wherein $R_5$ is selected from the group consisting of a $C_1$-$C_{12}$ alkyl group, a $C_1$-$C_{12}$ hydroxyalkyl group, a $C_1$-$C_{12}$ cycloalkyl group, a $C_1$-$C_{12}$ aryl group, oxyalkyl, —Cl, —Br, —CN, —OH, —OCH$_3$, —OC$_2$H$_5$, —OC$_3$H$_7$, —OC$_4$H$_9$, —OC$_5$H$_{11}$, and —OC$_6$H$_{13}$;
and
(ii) At Least One Anionic Surfactant Having Structural Formula:

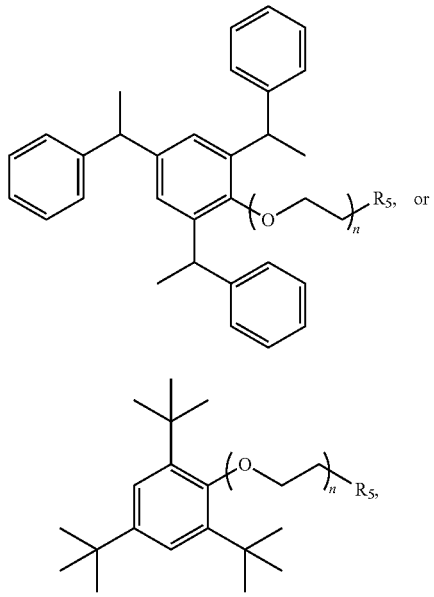

IIIA-2

IIIB-2 wherein, n is an integer of from 1 to 100, wherein $R_5$ is selected from the group consisting of alkylphosphonate, alkylphosphate, alkylsulfate, alkylsulfonate, phosphonate, phosphate, sulfate, sulfonate, carboxylate, a quaternary ammonium ion, and any salt thereof.

The present invention further includes a method of preparing a latex binder composition, comprising adding one or a blend of surface active alkoxylated compound surfactant(s) (emulsifier(s)) of structural formula IIA, IIB, IIC and/or IIC-1 as described above to an aqueous dispersion of a latex polymer to produce the latex binder. The at least one pigment and other additives can then be mixed with the resulting latex binder to produce the aqueous coating composition in any appropriate order. The addition of the surface active alkoxylated compound of structural formula IIA, IIB, IIC or IIC-1 to the latex polymer forms a mixture having a lower VOC content.

In another embodiment, the invention is a method of adding one or a blend of the above-described surface active compound of structural formula IIA, IIB, IIC or IIC-1 during formulation of paint or aqueous coating composition to (1) increase open time, (2) decrease drying time, or (3) both increase open time and decrease drying time. Formulation is the stage at which additives are added to a base aqueous latex polymer dispersion to make it into final product such as a paint or coating.

In another embodiment, the present invention is method for increasing open time for a low VOC coating composition comprising adding to the composition an effective amount of an open time additive, wherein the open time additive is a blend of:

(i) At Least One Non-Ionic Surfactant Having Structural Formula:

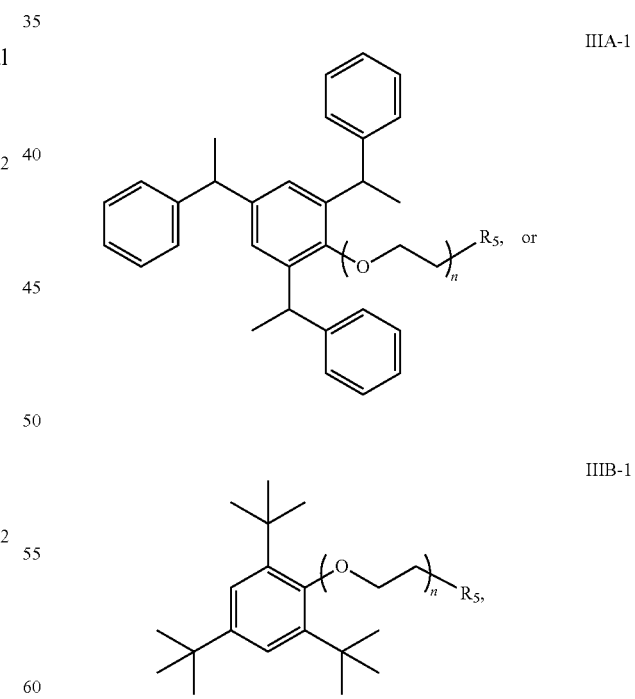

IIIA-1

IIIB-1 wherein, n is an integer of from 1 to 100, wherein $R_5$ is selected from the group consisting of a $C_1$-$C_{12}$ alkyl, hydroxyalkyl, cycloalkyl, aryl or aralkyl, oxyalkyl, —Cl, —Br, —CN, —OH, —OCH$_3$, —OC$_2$H$_5$, —OC$_3$H$_7$, —OC$_4$H$_9$, —OC$_5$H$_{11}$, and —OC$_6$H$_{13}$; and (ii) At Least One Anionic Surfactant Having Structural Formula:

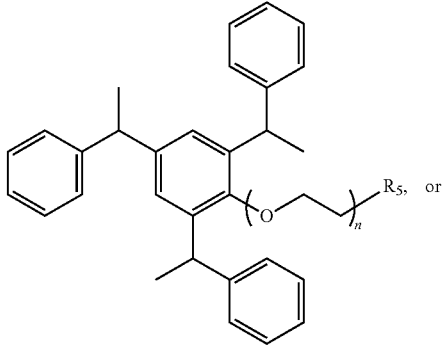
IIIA-2

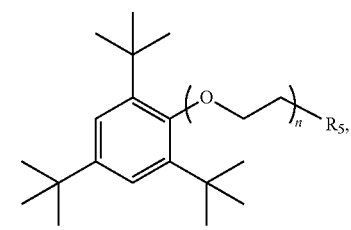
IIIB-2 wherein, n is an integer of from 1 to 100, wherein $R_5$ is selected from the group consisting of alkylphosphonate, alkylphosphate, alkylsulfate, alkylsulfonate, phosphonate, phosphate, sulfate, sulfonate, carboxylate, a quaternary ammonium ion, and any salt thereof.

In a further embodiment, the present invention is method for decreasing the drying time for a low VOC coating composition comprising adding to the composition an effective amount of a drying time additive of formula IIA, IIB, IIC or IIC-1. In yet another embodiment, the present invention is method for decreasing the drying time for a low VOC coating composition comprising adding to the composition an effective amount of a drying time additive, wherein the drying time additive is a blend of:

(i) At Least One Non-Ionic Surfactant Having Structural Formula:

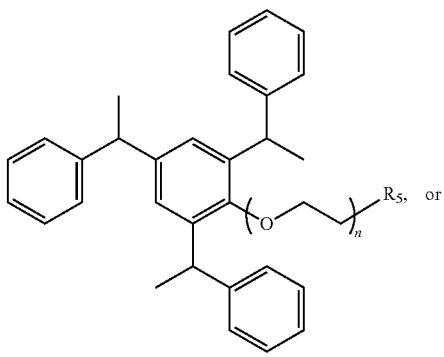
IIIA-1

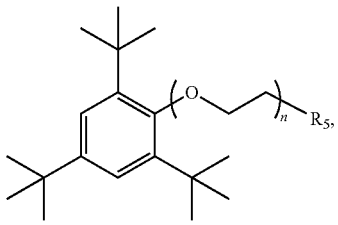
IIIB-1 wherein, n is an integer of from 1 to 100, wherein $R_5$ is selected from the group consisting of a $C_1$-$C_{12}$ alkyl, hydroxyalkyl, cycloalkyl, aryl or aralkyl, oxyalkyl, —Cl, —Br, —CN, —OH, —OCH$_3$, —OC$_2$H$_5$, —OC$_3$H$_7$, —OC$_4$H$_9$, —OC$_5$H$_{11}$, and —OC$_6$H$_{13}$; and (ii) At Least One Anionic Surfactant Having Structural Formula:

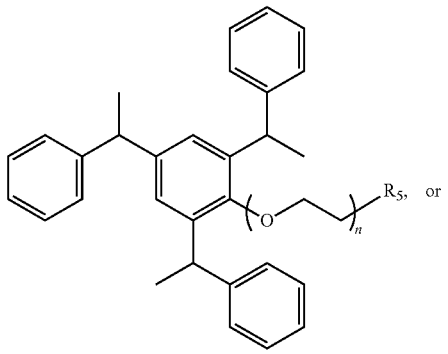
IIIA-2

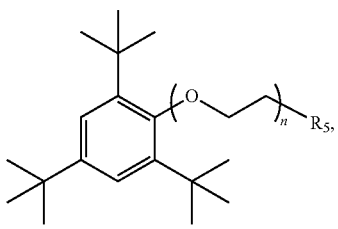
IIIB-2 wherein, n is an integer of from 1 to 100, wherein $R_5$ is selected from the group consisting of alkylphosphonate, alkylphosphate, alkylsulfate, alkylsulfonate, phosphonate, phosphate, sulfate, sulfonate, carboxylate, a quaternary ammonium ion, and any salt thereof.

When the surface active alkoxylated compound is employed as an additive to an already formed paint or aqueous coating composition, e.g., aqueous latex coating dispersion, the resulting composition has alkoxylated compound additive typically in an amount greater than about 1.3% by weight of the polymer or monomers used to form the latex polymer, more typically in an amount greater than about 1.6% by weight of the polymer or monomers used to form the latex polymer, yet more typically in an amount greater than about 2% by weight of the polymer or monomers used to form the latex polymer, even more typically in an amount greater than about 4% by weight of the polymer or monomers used to form the latex polymer, and most typically in an amount greater than about 7.5% by weight of the polymer or monomers used to form the latex polymer. In another embodiment, the latex coating composition contains surface active alkoxylated compound in an amount between about 1.6% and 7.5% by weight of the polymer or monomers used to form the latex polymer. In another embodiment, the latex coating composition contains surface active alkoxylated compound in an amount between about 1.6% and 45% by weight of the polymer or monomers used to form the latex polymer, typically between about 1.6% and 35%. Pigment is a typical additive, for example, added during formulation of paint from raw aqueous latex polymer dispersion.

The aqueous coating compositions of the present invention have improved open time properties where the open time additive is present in the aqueous coating composition in the amounts by weight of the polymer as described above, where the polymer can have a Tg of between about −20° C. and about 12° C. and a mean particle size of less than about 200 nm, or a Tg of between about −10° C. and about 10° C. and a mean particle size of less than about 200 nm, or a Tg of between about −10° C. and about 0° C. and a mean particle size of less than about 200 nm, or a Tg of between about −20° C. and about 12° C. and a mean particle size of less than about 190 nm, or a Tg of between about −10° C. and about 10° C. and a mean particle size of less than about 190 nm, or a Tg of between about −10° C. and about 0° C. and a mean particle size of less than about 190 nm, or a Tg of between about −20° C. and about 12° C. and a mean particle size of less than about 175 nm, or a Tg of between about −10° C. and about 10° C. and a mean particle size of less than about 175 nm, or a Tg of between about −10° C. and about 0° C. and a mean particle size of less than about 175 nm. As described above, the mean particle size is typically between about 75 nm to about 400 nm. The aqueous coating composition of the present invention has an open time of greater than about 4 minutes in one embodiment, an open time of greater than about 6 minutes in another embodiment, an open time of greater than about 8 minutes in another embodiment, an open time of greater than about 10 minutes in yet another embodiment, an open time of greater than about 12 minutes in a further embodiment, and/or an open time of greater than about 14 minutes in yet a further embodiment.

The present invention further includes a method of preparing a paint or aqueous coating composition, comprising adding the at least one surface active alkoxylated compound of structural formula IIA, IIB, IIC and/or IIC-1 as described above during formulation of paint or aqueous coating composition comprising at least one pigment and other additives to produce the final paint or aqueous coating composition. The addition of the surface active alkoxylated compound surfactant (emulsifier) during formulation of paint or aqueous coating composition forms a coating composition having a lower VOC content while imparting improved open time properties to the aqueous coating composition.

Other Additives

The aqueous coating compositions of the invention include at least one latex polymer derived from at least one monomer, for example acrylic monomers and/or the other above-described latex monomers. The aqueous coating compositions of the invention include less than 2% by weight and typically less than 1.0% by weight of anti-freeze agents based on the total weight of the aqueous coating composition. More typically, the aqueous coating compositions are substantially free of anti-freeze agents.

The aqueous coating composition typically includes at least one pigment. The term "pigment" as used herein includes non-film-forming solids such as pigments, extenders, and fillers. The at least one pigment is typically selected from the group consisting of TiO2 (in both anastase and rutile forms), clay (aluminum silicate), CaCO3 (in both ground and precipitated forms), aluminum oxide, silicon dioxide, magnesium oxide, talc (magnesium silicate), barytes (barium sulfate), zinc oxide, zinc sulfite, sodium oxide, potassium oxide and mixtures thereof. Suitable mixtures include blends of metal oxides such as those sold under the marks MINEX (oxides of silicon, aluminum, sodium and potassium commercially available from Unimin Specialty Minerals), CELITES (aluminum oxide and silicon dioxide commercially available from Celite Company), ATOMITES (commercially available from English China Clay International), and ATTAGELS (commercially available from Engelhard). More typically, the at least one pigment includes TiO2, CaCO3 or clay. Generally, the mean particle sizes of the pigments range from about 0.01 to about 50 microns. For example, the TiO2 particles used in the aqueous coating composition typically have a mean particle size of from about 0.15 to about 0.40 microns. The pigment can be added to the aqueous coating composition as a powder or in slurry form. The pigment is typically present in the aqueous coating composition in an amount from about 5 to about 50 percent by weight, more typically from about 10 to about 40 percent by weight.

The coating composition can optionally contain additives such as one or more film-forming aids or coalescing agents. Suitable firm-forming aids or coalescing agents include plasticizers and drying retarders such as high boiling point polar solvents. Other conventional coating additives such as, for example, dispersants, additional surfactants (i.e. wetting agents), rheology modifiers, defoamers, thickeners, biocides, mildewcides, colorants such as colored pigments and dyes, waxes, perfumes, co-solvents, and the like, can also be used in accordance with the invention. For example, non-ionic and/or ionic (e.g. anionic or cationic) surfactants can be used to produce the polymer latex. These additives are typically present in the aqueous coating composition in an amount from 0 to about 15% by weight, more typically from about 1 to about 10% by weight based on the total weight of the coating composition.

As mentioned above, the aqueous coating composition in some embodiments can include less than 2.0% of VOC agents based on the total weight of the aqueous coating composition. Exemplary agents include ethylene glycol, diethylene glycol, propylene glycol, glycerol (1,2,3-trihydroxypropane), ethanol, methanol, 1-methoxy-2-propanol, 2-amino-2-methyl-1-propanol, and FTS-365 (a freeze-thaw stabilizer from Inovachem Specialty Chemicals). More typically, the aqueous coating composition includes less than 1.0% or is substantially free (e.g. includes less than 0.1%) of anti-freeze agents. Accordingly, the aqueous coating composition of the invention typically has a VOC level of less than about 100 g/L and more typically less than or equal to about 50 g/L.

The aqueous coating compositions of the invention can be subjected to freeze-thaw cycles using ASTM method D2243-82 or ASTM D2243-95 without coagulation.

The balance of the aqueous coating composition of the invention is water. Although much of the water is present in the polymer latex dispersion and in other components of the aqueous coating composition, water is generally also added separately to the aqueous coating composition. Typically, the aqueous coating composition includes from about 10% to about 85% by weight and more typically from about 35% to about 80% by weight water. Stated differently, the total solids content of the aqueous coating composition is typically from about 15% to about 90%, more typically, from about 20% to about 65%.

The coating compositions are typically formulated such that the dried coatings comprise at least 10% by volume of dry polymer solids, and additionally 5 to 90% by volume of non-polymeric solids in the form of pigments. The dried coatings can also include additives such as plasticizers, dispersants, surfactants, rheology modifiers, defoamers, thickeners, biocides, mildewcides, colorants, waxes, and the like, that do not evaporate upon drying of the coating composition.

In one preferred embodiment of the invention, the aqueous coating composition is a latex paint composition comprising at least one latex polymer derived from at least one acrylic monomer selected from the group consisting of acrylic acid, acrylic acid esters, methacrylic acid, and methacrylic acid esters and at least one polymerizable alkoxylated surfactant; at least one pigment and water. As mentioned above, the at least one latex polymer can be a pure acrylic, a styrene acrylic, a vinyl acrylic or an acrylated ethylene vinyl acetate copolymer.

The present invention further includes a method of preparing an aqueous coating composition by mixing together at least one latex polymer derived from at least one monomer and copolymerized and/or blended with at least one tristyrylphenol as described above, and at least one pigment. Typically, the latex polymer is in the form of a latex polymer dispersion. The additives discussed above can be added in any suitable order to the latex polymer, the pigment, or combinations thereof, to provide these additives in the aqueous coating composition. In the case of paint formulations, the aqueous coating composition typically has a pH of from 7 to 10.

Referring now to FIG. 1, a chart shows the open time measurement of a latex sample using multispeckle Diffusing—Wave Spectroscopy (MS-DWS). The MS-DWS chart also illustrates drying time characteristics. The MS-DWS applies the Horus™ method, which is an optical measurement of the scatterers motion inside a sample enabling a more accurate measurement of working time properties. More specifically, a laser light illuminates the coating sample. If the sample contains scattering material (e.g., latex particles) the photons are scattered by these objects bearing a different refractive index than the bulk. The scattered light is detected by a camera which captures an image called a "speckle" image. When the sample undergoes time-dependent action, this action produces temporal fluctuations in the backscattered light and changes of light intensity on the speckle image. In other words, intensity fluctuations of the speckle spots. Thus, a direct relationship exists between the motion of scatterers (i.e., light scattering particles such as latex) inside the sample and intensity fluctuations on the speckle image. Fast activity inside the sample generates fast changes of the backscattered light, and fast intensity fluctuations of the speck spots. Inversely, a slow action (slow motion of scatterers) induces slow changes of the backscattered light, and slow intensity fluctuations of the speckle spots. The MS-DWS utilized is attributable to Formulaction, Wynnewood, Pa.

As shown in FIG. 1, The chart shows the sample profile in 3 stages: stage 1, i.e., evaporation stage, is where the evaporation of solvents generates a fast motion of scatterers that decreases slowly as the concentration of the media increases; stage 2, i.e., packing stage, is where the scatterers come into contact leading to accelerations and decelerations as they encounter each others and pack; and stage 3, particle deformation or drying phase, is where interdiffusion/coalescence/autohesion occur.

T1, which is the end of stage 1, typically corresponds to the open time (time where the paint is still workable), where a higher T1 time correlates to longer open time. The latex sample without any additive (of the present invention) has a T1 time of 7.85 s, where the latex sample with 2% additive and 4% additive shows a T1 time of 11.0 s and 21.5 s, respectively. Thus, an increasing amount of additive correlates to an increasing open time, which is desirable in paint and coating formulations.

At the beginning of stage 3 (or otherwise end of stage 2), the fluidity factor decreases sharply, which typically indicates a drastic reduction of the average motion speed of the scatterers inside the sample, indicating that the sample is in the drying phase. As shown in FIG. 1, the beginning of stage 3 occurs at and after about 20 minutes, indicated by the sharp curve in the fluidity factor line. Typically, the beginning of stage 3 (T2) correlates to drying time, where a shorter T2 time corresponds to the sample drying faster relative to a longer T2 time. As can be seen from FIG. 1, the T2 time of the latex sample with 4% additive is about 20 minutes, the T2 time of the latex sample with 2% additive is about 23 minutes, and the latex sample with no additive is about 24 minutes. Thus, an increasing amount of additive correlates to a decreasing drying time, which is desirable in paint and coating formulations. This is also is unexpected as one would expect to have an increase in drying time as the open time is increased through use of the additive(s) of the present invention.

The present invention will now be further described by the following non-limiting examples. As described above, the present invention may employ (I) surface active alkoxylated compounds as a surfactant (emulsifier) to be present during latex polymer formation, (II) polymerizable reactive alkoxylated monomers to form a latex comonomer, and/or (III) surface active alkoxylated compounds as an additive to an aqueous dispersion of latex polymer or copolymer.

EXAMPLES

The following Examples describe the present invention as surface active alkoxylated compounds utilized as one or more open time additives, including a blend of open time additives, to an aqueous dispersion of latex polymer or copolymer.

Examples 1-2

Tables 1 and 2 illustrate the effects of TSP Ethoxylate nonionic surfactants on open time of Low VOC Paints and the Effects of TSP Ethoxylate anionic surfactants on open time of Low VOC Paints, respectively. Open time is generally understood to be the interval, after the paint is applied, during which it can be blended with additional painted regions. Open time refers to the amount of time a newly-applied layer of paint remains workable before brush strokes and other signs of manipulation become visible in dried films. The method for measuring Open Time is generally as follows: a 10 mils film is drawn down on a piece of black scrub test paper. The paint film is then cross-hatched in two-inch intervals with the eraser end of a pencil. The first cross hatch then brushed over in one direction 15 times; this is then repeated in two-minute intervals for each successive cross-hatch. After 24 hrs, the dry films are examined for the earliest times at which traces of cross-hatch at discernable. This is performed under constant humidity, room temp. It is desirable for paint formulations to have an open time of greater than 4 minutes, typically, greater than 6 minutes. The amount of reagent (both nonionic surfactants and anionic surfactants) varied from about 2.5 grams surfactant to about 4.25 grams surfactant per 256 grams of paint.

TABLE 1

| Reagent (Nonionic Surfactants) | starting viscosity (KU) | open time (minutes) sample | Control |
|---|---|---|---|
| TSP-EO #1 | 89.9 | >14 | 4 |
| TSP-EO #2 | 85 | >14 | 4 |
| TSP-EO #3 | 82 | 14 | 2 to 4 |
| TSP-EO #4 | 81.2 | >14 | 4 |
| TSP-EO #5 | 89.9 | 4 | 2 |

TABLE 2

| Reagent (Anionic Surfactants) | starting viscosity (KU) | open time (minutes) sample | Control |
|---|---|---|---|
| TSP-EO Sulfate TEA salt | 83.3 | 14 | 2 to 4 |
| TSP-EO Sulfate Ammonium Salt | 83.5 | 8 to 10 | 2 |
| TSP-EO Sulfate Potassium Salt 1 | 86.4 | 8 to 12 | 2 |
| TSP-EO-PO | 83.5 | >14 | 4 |

Referring back to Tables 1 and 2, it is observed that open time increased significantly when utilizing either the non-ionic TSP additives or anionic TSP additives, respectively.

Example 3

In Example 3, the measuring of open time is similar to that used in Examples 1-2. A blend of an anionic TSP Ethoxylate surfactant and a non-ionic TSP Ethoxylate surfactant was post-added to commercial zero and low VOC paints. The open time was measured using ASTM standard method (WK 13360).

Tables 3 and 4 illustrate the effect of a blend of (i) one or more TSP Ethoxylate nonionic surfactants with (ii) one or more TSP Ethoxylate anionic surfactants, on open time of Zero VOC Paints and Low VOC Paints, respectively.

TABLE 3

Effects of TSP Ethoxylate Surfactants on Open Time of Zero VOC Paints.

| Blend of Surfactants | White Base (10.0 lbs/100 gals) | Open Time, minutes Control | Trial |
|---|---|---|---|
| TSP-EO anionic/TSP-EO nonionic #1 | 270 + 2.78 | 4.0 | 14.0 |
| TSP-EO anionic/TSP-EO nonionic #2 | 270 + 3.13 | 6.0 | 14.0 |
| TSP-EO anionic/TSP-EO nonionic #3 | 270 + 3.13 | 6.0 | 14.0 |
| TSP-EO anionic/TSP-EO nonionic #4 | 270 + 3.13 | 4.0 | 8.0 |
| TSP-EO anionic/TSP-EO nonionic #5 | 270 + 3.57 | 4.0 | 8.0 |

As shown in Table 3, blends #1, #2, #3, #4 and #5 each show a blend of an anionic TSP surfactant and a nonionic TSP surfactant with the non-ionic surfactant having ethylene oxide (eo) groups or units ranging from about 9 to about 90.

TABLE 2

Effects of TSP Ethoxylate Surfactants on Open Time of Low VOC Paints

| Blending Surfactants | White Base (10.0 lbs/100 gals) | Open Time, minutes Control | Trial |
|---|---|---|---|
| TSP-EO anionic/TSP-EO nonionic #1 | 256 + 2.78 | 6.0 | 14.0 |
| TSP-EO anionic/TSP-EO nonionic #2 | 256 + 3.13 | 4.0 | 12.0 |
| TSP-EO anionic/TSP-EO nonionic #3 | 256 + 3.13 | 4.0 | 12.0 |
| TSP-EO anionic/TSP-EO nonionic #4 | 256 + 3.13 | 4.0 | 12.0 |
| TSP-EO anionic/TSP-EO nonionic #5 | 256 + 3.13 | 6.0 | 12.0 |

Similar to Table 3, Table 4 shows #1, #2, #3, #4 and #5 being blends of an anionic TSP surfactant and a nonionic TSP surfactant with the non-ionic surfactant having ethylene oxide (eo) groups or units ranging from about 9 to about 90.

In the above detailed description, preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description. It is understood that upon reading the above description of the present invention, one skilled in the art could make changes and variations therefrom. These changes and variations are included in the spirit and scope of the following appended claims.

What is claimed is:

1. A low VOC coating composition comprising:
   (a) at least one latex polymer;
   (b) water; and
   (c) at least one open time additive present during formulation of the coating composition in an amount effective to increase the open time of the coating composition to greater than about 4 minutes, the at least one open time additive having structural formula IIA:

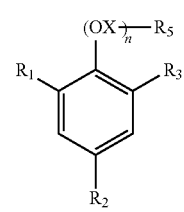

IIA wherein $R_1$, $R_2$ and $R_3$ are independently selected from the group consisting of:

a $C_1$-$C_{18}$ alkyl, hydroxyalkyl, cycloalkyl, aryl or aralkyl, —H, butyl, tert-butyl, isobutyl,

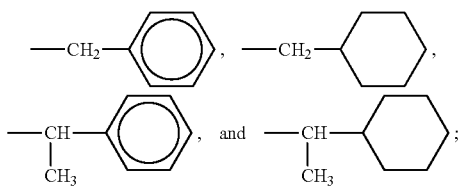

wherein X is a divalent hydrocarbon radical comprising a linear or branched alkylene radical having from about 2 to 8 carbon atoms; wherein n is an integer of from 1 to 100; wherein $R_5$ is selected from the group consisting of —OH, —$OCH_3$, —$OC_2H_5$, —$OC_3H_7$, —$OC_4H_9$, —$OC_5H_{11}$, —$OC_6H_{13}$, —Cl, —Br, —CN, Phosphonate (—$PO_3^-M^+$), Phosphate ($PO_4^-M^+$), Sulfate ($SO_4^-M^+$), Sulfonate ($SO_3^-M^+$), carboxylate ($COO^-M^+$), a nonionic group, a $C_1$-$C_{12}$ alkyl group, a $C_1$-$C_{12}$ hydroxyalkyl group, a $C_1$-$C_{12}$ cycloalkyl group, a $C_1$-$C_{12}$ aryl group, a $C_1$-$C_{12}$ aralkyl group and a quaternary ammonium ion, wherein M+ is a cation, wherein the open time additive is present in an amount greater than about 1% by weight of the polymer.

2. The coating composition of claim 1 further comprising at least one pigment.

3. The coating composition of claim 1 wherein n is an integer of from about 3 to about 80.

4. The coating composition of claim 1 wherein n is an integer of from about 10 to about 40.

5. The coating composition according to claim 1 wherein the open time additive is present in an amount greater than about 2% by weight of the polymer.

6. The coating composition according to claim 1, wherein the open time additive is present in an amount greater than about 8% by weight of the polymer.

7. The coating composition according to claim 1, wherein the open time additive is present in an amount greater than about 10% by weight of the polymer.

8. The coating composition according to claim 1, wherein the open time additive is present in an amount greater than about 20% by weight of the polymer.

9. The coating composition of claim 1 wherein the polymer has a glass transition temperature (Tg) of between about −20° C. and about 50° C.

10. The coating composition of claim 1 wherein the polymer has a glass transition temperature (Tg) of between about −20° C. and about 12° C.

11. The coating composition of claim 1 wherein the polymer has a glass transition temperature (Tg) of between about −10° C. and about 10° C.

12. The coating composition of claim 1 wherein the polymer has a glass transition temperature (Tg) of between about −10° C. and about 0° C.

13. The coating composition of claim 1 wherein the polymer has a mean particle size of less than about 200 nm.

14. The coating composition of claim 1 wherein the polymer has a mean particle size of less than about 150 nm.

15. The coating composition of claim 1 wherein the polymer has a mean particle size of less than about 125 nm.

16. The coating composition of claim 1 wherein the coating composition is characterized by an open time of greater than about 6 minutes.

17. The coating composition of claim 1 wherein the coating composition is characterized by an open time of greater than about 8 minutes.

18. The coating composition of claim 1 wherein the coating composition is characterized by an open time of greater than about 10 minutes.

19. The coating composition of claim 1 wherein the coating composition is characterized by an open time of greater than about 12 minutes.

20. The coating composition of claim 1 wherein the coating composition is characterized by an open time of greater than about 14 minutes.

21. The coating composition of claim 1, wherein the open time additive has structural formula:

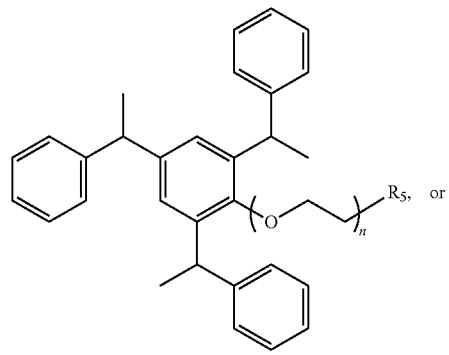

IIA-1

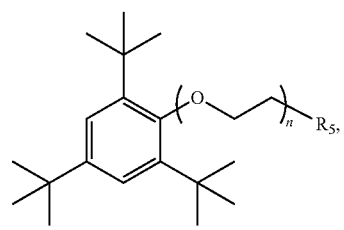

IIA-2 wherein, n is an integer of from 1 to 100, wherein $R_5$ is selected from the group consisting of —OH, —$OCH_3$, —$OC_2H_5$, —$OC_3H_7$, —$OC_4H_9$, —$OC_5H_{11}$, —$OC_6H_{13}$, —Cl, —Br, —CN, Phosphonate (—$PO_3^-M^+$), Phosphate ($PO_4^-M^+$), Sulfate ($SO_4^-M^+$), Sulfonate ($SO_3^-M^+$), carboxylate ($COO^-M^+$), a nonionic group, a $C_1$-$C_{12}$ alkyl group, a $C_1$-$C_{12}$ hydroxyalkyl group, a $C_1$-$C_{12}$ cycloalkyl group, a $C_1$-$C_{12}$ aryl group, a $C_1$-$C_{12}$ aralkyl group, and a quaternary ammonium ion, wherein M+ is a cation.

22. A low VOC coating composition comprising:

(a) at least one latex polymer;

(b) water; and (c) an open time additive present during formulation of the coating composition in an amount effective to increase the open time of the coating composition to greater than about 4 minutes;

wherein the open time additive is a blend of:
(i) at least one non-ionic surfactant having structural formula:

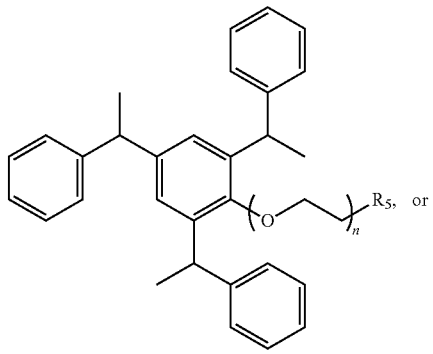

IIIA-1

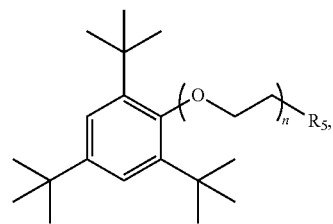

IIIB-1 wherein, n is an integer of from 1 to 100, wherein $R_5$ is selected from the group consisting of a $C_1$-$C_{12}$ alkyl group, a $C_1$-$C_{12}$ hydroxyalkyl group, a $C_1$-$C_{12}$ cycloalkyl group, a $C_1$-$C_{12}$ aryl group, a $C_1$-$C_{12}$ aralkyl group, oxyalkyl, —Cl, —Br, —CN, —OH, —OCH$_3$, —OC$_2$H$_5$, —OC$_3$H$_7$, —OC$_4$H$_9$, —OC$_5$H$_{11}$ and —OC$_6$H$_{13}$; and
(ii) at least one anionic surfactant having structural formula:

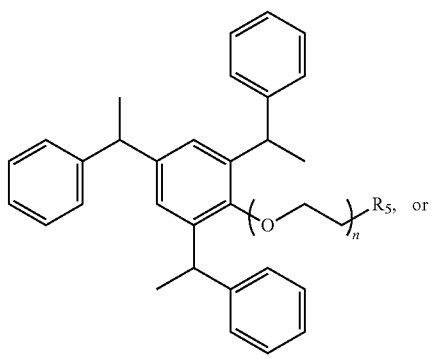

IIIA-2

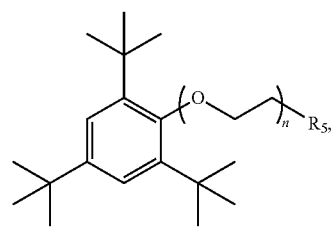

IIIB-2 wherein, n is an integer of from 1 to 100, wherein $R_5$ is selected from the group consisting of alkylphosphonate, alkylphosphate, alkylsulfate, alkylsulfonate, phosphonate, phosphate, sulfate, sulfonate, carboxylate, a quaternary ammonium ion, and any salt thereof,
wherein the open time additive is present in an amount greater than about 0.5% by weight of the polymer.

23. The coating composition of claim 22 wherein n is an integer of from about 3 to about 80.

24. The coating composition of claim 22 wherein n is an integer of from about 4 to about 60.

25. The coating composition of claim 22 wherein n is an integer of from about 8 to about 60.

26. The coating composition of claim 22 wherein the open time additive is present in an amount greater than about 1% by weight of the polymer.

27. The coating composition according to claim 22, wherein the open time additive is present in an amount greater than about 2% by weight of the polymer.

28. The coating composition according to claim 22, wherein the open time additive is present in an amount greater than about 7.5% by weight of the polymer.

29. The coating composition according to claim 22, wherein the open time additive is present in an amount greater than about 8% by weight of the polymer.

30. The coating composition according to claim 22, wherein the open time additive is present in an amount greater than about 10% by weight of the polymer.

31. The coating composition according to claim 22, wherein the open time additive is present in an amount greater than about 20% by weight of the polymer.

32. The coating composition of claim 22 wherein the polymer has a glass transition temperature (Tg) of between about −20° C. and about 50° C.

33. The coating composition of claim 22 wherein the polymer has a glass transition temperature (Tg) of between about −10° C. and about 10° C.

34. The coating composition of claim 22 wherein the polymer has a glass transition temperature (Tg) of between about −10° C. and about 0° C.

35. The coating composition of claim 22 wherein the polymer has a mean particle size of less than about 200 nm.

36. The coating composition of claim 22 wherein the polymer has a mean particle size of less than about 150 nm.

37. The coating composition of claim 22 wherein the polymer has a mean particle size of less than about 125 nm.

38. The coating composition of claim 22 wherein the coating composition is characterized by an open time of greater than about 6 minutes.

39. The coating composition of claim 22 wherein the coating composition is characterized by an open time of greater than about 8 minutes.

40. The coating composition of claim 22 wherein the coating composition is characterized by an open time of greater than about 10 minutes.

41. The coating composition of claim 22 wherein the coating composition is characterized by an open time of greater than about 12 minutes.

42. The coating composition of claim 22 wherein the coating composition is characterized by an open time of greater than about 14 minutes.

43. A method for increasing open time for a low VOC coating composition comprising adding to the composition, during formulation of the composition, an effective amount of an open time additive, wherein the open time additive comprises at least one compound according to structural formula:

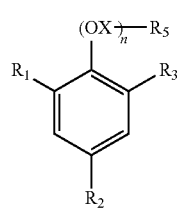

IIA wherein $R_1$, $R_2$ and $R_3$ are independently selected from the group consisting of:
a $C_1$-$C_{18}$ alkyl, hydroxyalkyl, cycloalkyl, aryl or aralkyl, —H, butyl, tert-butyl, isobutyl,

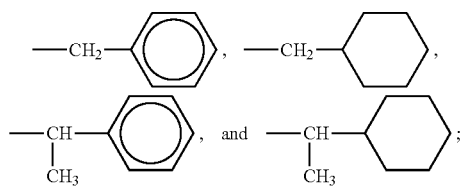

wherein X is a divalent hydrocarbon radical comprising a linear or branched alkylene radical having from about 2 to 8 carbon atoms; wherein n is an integer of from 1 to 100; $R_5$ is selected from the group consisting of a $C_1$-$C_{12}$ alkyl group, a $C_1$-$C_{12}$ hydroxyalkyl group, a $C_1$-$C_{12}$ cycloalkyl group, a $C_1$-$C_{12}$ aryl group, a $C_1$-$C_{12}$ aralkyl group, —OH, —OCH$_3$, —OC$_2$H$_5$, —OC$_3$H$_7$, —OC$_4$H$_9$, —OC$_5$H$_{11}$, —OC$_6$H$_{13}$, —Cl, —Br, —CN, alkylphosphonate, alkylphosphate, alkylsulfate, alkylsulfonate, phosphonate, phosphate, sulfate, sulfonate, carboxylate, a nonionic group, a quaternary ammonium ion, and any salt thereof,
wherein the effective amount is an amount of the additive greater than about 1% by weight of the polymer.

44. The method of claim 43 wherein the effective amount is an amount of the additive greater than about 1.3% by weight of the polymer.

45. The method of claim 43 wherein the effective amount is an amount of the additive greater than about 8% by weight of the polymer.

46. The method of claim 43 wherein the step of adding the open time additive increases the open time of the composition to greater than about 6 minutes.

47. The method of claim 43 wherein the step of adding the open time additive increases the open time of the composition to greater than about 8 minutes.

48. The method of claim 43 wherein the step of adding the open time additive increases the open time of the composition to greater than about 10 minutes.

49. The method of claim 43 wherein the step of adding the open time additive increases the open time of the composition to greater than about 12 minutes.

50. The method of claim 43 wherein the step of adding the open time additive increases the open time of the composition to greater than about 14 minutes.

51. The method of claim 43 wherein the open time additive is a blend of:

(i) at least one non-ionic surfactant having structural formula:

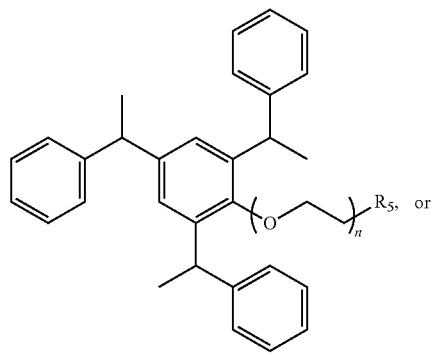

IIIA-1

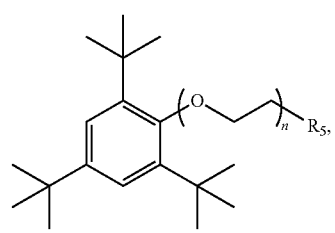

IIIB-1 wherein, n is an integer of from 1 to 100, wherein $R_5$ is selected from the group consisting of a $C_1$-$C_{12}$ alkyl group, a $C_1$-$C_{12}$ hydroxyalkyl group, a $C_1$-$C_{12}$ cycloalkyl group, a $C_1$-$C_{12}$ aryl group, a $C_1$-$C_{12}$ aralkyl group, oxyalkyl, —Cl, —Br, —CN, —OH, —OCH$_3$, —OC$_2$H$_5$, —OC$_3$H$_7$—OC$_4$H$_9$, —OC$_5$H$_{11}$, and —OC$_6$H$_{13}$; and (ii) at least one anionic surfactant having structural formula:

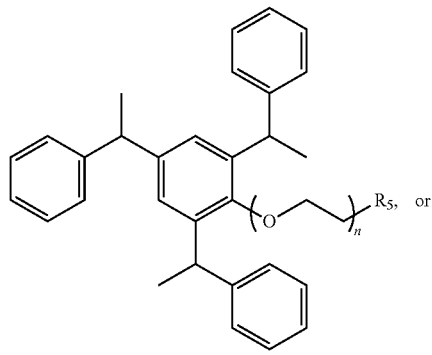

IIIA-2

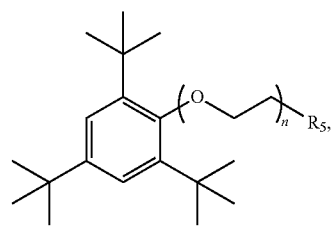

IIIB-2 wherein, n is an integer of from 1 to 100, wherein $R_5$ is selected from the group consisting of alkylphosphonate, alkylphosphate, alkylsulfate, alkylsulfonate, phosphonate, phosphate, sulfate, sulfonate, carboxylate, a quaternary ammonium ion, and any salt thereof.

52. A low VOC or zero VOC latex coating composition comprising:
(a) at least one latex polymer;
(b) water; and
(c) at least one drying time additive present during formulation of the coating composition in an amount effective to decrease the drying time of the coating composition, the drying additive having structural formula IIA:

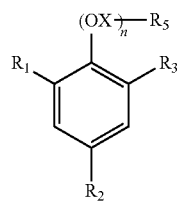

IIA wherein $R_1$, $R_2$ and $R_3$ are independently selected from the group consisting of:
a $C_1$-$C_{18}$ alkyl, hydroxyalkyl, cycloalkyl, aryl or aralkyl, —H, butyl, tert-butyl, isobutyl,

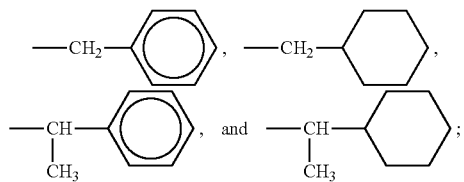

wherein X is a divalent hydrocarbon radical comprising a linear or branched alkylene radical having from about 2 to 8 carbon atoms; wherein n is an integer of from 1 to 100; wherein $R_5$ is selected from the group consisting of —OH, —OCH$_3$, —OC$_2$H$_5$, —OC$_3$H$_7$, —OC$_4$H$_9$, —OC$_5$H$_{11}$, —OC$_6$H$_{13}$, —Cl, —Br, —CN, Phosphonate (—PO$_3^-$M$^+$), Phosphate (PO$_4^-$M$^+$), Sulfate (SO$_4^-$M$^+$), Sulfonate (SO$_3^-$M$^+$), carboxylate (COO$^-$M$^+$), a nonionic group, a $C_1$-$C_{12}$ alkyl group, a $C_1$-$C_{12}$ hydroxyalkyl group, a $C_1$-$C_{12}$ cycloalkyl group, a $C_1$-$C_{12}$ aryl group, a $C_1$-$C_{12}$ aralkyl group and a quaternary ammonium ion, wherein M+ is a cation,
wherein the drying time additive is present in an amount greater than about 1% by weight of the polymer.

53. The coating composition of claim 52, wherein the drying time additive has structural formula:

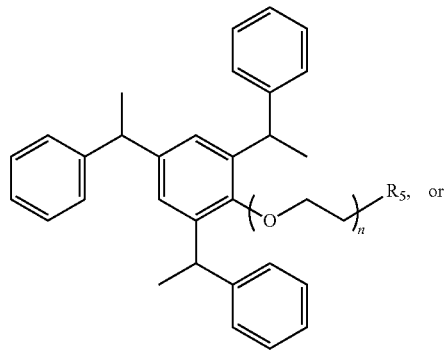

IIA-1

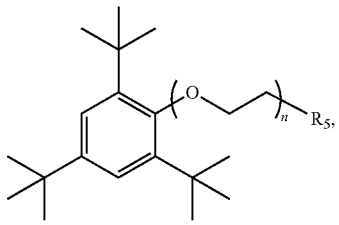

IIA-2 wherein, n is an integer of from 1 to 100, wherein $R_5$ is selected from the group consisting of —OH, —OCH$_3$, —OC$_2$H$_5$, —OC$_3$H$_7$, —OC$_4$H$_9$, —OC$_5$H$_{11}$, —OC$_6$H$_{13}$, —Cl, —Br, —CN, Phosphonate (—PO$_3^-$M$^+$), Phosphate (PO$_4^-$M$^+$), Sulfate (SO$_4^-$M$^+$), Sulfonate (SO$_3^-$M$^+$), carboxylate (COO$^-$M$^+$), a nonionic group, a $C_1$-$C_{12}$ alkyl group, a $C_1$-$C_{12}$ hydroxyalkyl group, a $C_1$-$C_{12}$ cycloalkyl group, a $C_1$-$C_{12}$ aryl group, a $C_1$-$C_{12}$ aralkyl group, and a quaternary ammonium ion, wherein M+ is a cation.

54. A method for decreasing drying time for a low VOC or zero VOC coating composition comprising adding to the composition, during formulation of the coating composition, an effective amount of a drying time additive, wherein the drying time additive comprises at least one compound according to structural formula:

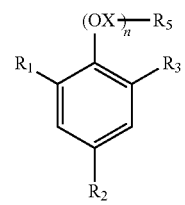

IIA wherein $R_1$, $R_2$ and $R_3$ are independently selected from the group consisting of:
butyl, tert-butyl, isobutyl,

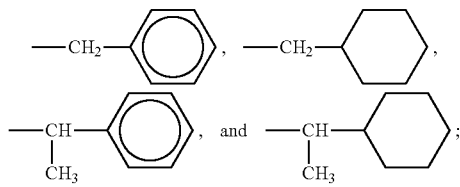

wherein X is a divalent hydrocarbon radical comprising a linear or branched alkylene radical having from about 2 to 8 carbon atoms; wherein n is an integer of from 1 to 100; $R_5$ is selected from the group consisting of a $C_1$-$C_{12}$ alkyl group, a $C_1$-$C_{12}$ hydroxyalkyl group, a $C_1$-$C_{12}$ cycloalkyl group, a $C_1$-$C_{12}$ aryl group, a $C_1$-$C_{12}$ aralkyl group, —OH, —OCH$_3$, —OC$_2$H$_5$, —OC$_3$H$_7$, —OC$_4$H$_9$, —OC$_5$H$_{11}$, —OC$_6$H$_{13}$, —Cl, —Br, —CN, alkylphosphonate, alkylphosphate, alkylsulfate, alkylsulfonate, phosphonate, phosphate, sulfate, sulfonate, carboxylate, a nonionic group, a quaternary ammonium ion, and any salt thereof,
wherein the drying time additive is present in an amount greater than about 1% by weight of the polymer.

55. The method of claim 54 wherein the drying time additive has structural formula:

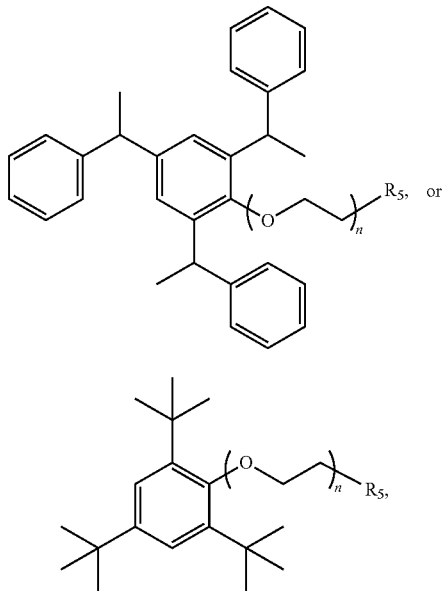

wherein, n is an integer of from 1 to 100, wherein $R_5$ is selected from the group consisting of —OH, —OCH$_3$, —OC$_2$H$_5$, —OC$_3$H$_7$, —OC$_4$H$_9$, —OC$_5$H$_{11}$, —OC$_6$H$_{13}$, —Cl, —Br, —CN, Phosphonate (—PO$_3^-$M$^+$), Phosphate (PO$_4^-$M$^+$), Sulfate (SO$_4^-$M$^+$), Sulfonate (SO$_3^-$M$^+$), carboxylate (COO$^-$M$^+$), a nonionic group, a C$_1$-C$_{12}$ alkyl group, a C$_1$-C$_{12}$ hydroxyalkyl group, a C$_1$-C$_{12}$ cycloalkyl group, a C$_1$-C$_{12}$ aryl group, a C$_1$-C$_{12}$ aralkyl group, and a quaternary ammonium ion, wherein M+ is a cation.

56. The coating composition according to claim 1, wherein the open time additive is present in an amount greater than about 1.6% by weight of the polymer.

57. A low VOC coating composition comprising:
(a) at least one latex polymer;
(b) water; and
(c) at least one open time additive post-added to the coating composition in an amount effective to increase the open time of the coating composition to greater than about 4 minutes, the at least one open time additive having structural formula IIA:

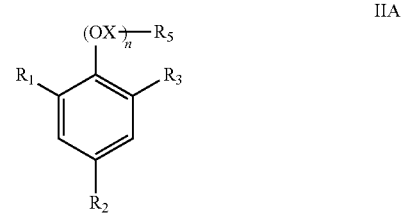

wherein $R_1$, $R_2$ and $R_3$ are independently selected from the group consisting of:
a C$_1$-C$_{18}$ alkyl, hydroxyalkyl, cycloalkyl, aryl or aralkyl, —H, butyl, tert-butyl, isobutyl,

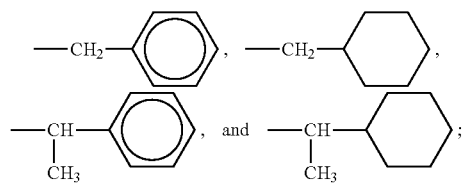

wherein X is a divalent hydrocarbon radical comprising a linear or branched alkylene radical having from about 2 to 8 carbon atoms; wherein n is an integer of from 1 to 100; wherein $R_5$ is selected from the group consisting of —OH, —OCH$_3$, —OC$_2$H$_5$, —OC$_3$H$_7$, —OC$_4$H$_9$, —OC$_5$H$_{11}$, —OC$_6$H$_{13}$, —Cl, —Br, —CN, Phosphonate (—PO$_3^-$M$^+$), Phosphate (PO$_4^-$M$^+$), Sulfate (SO$_4^-$M$^+$), Sulfonate (SO$_3^-$M$^+$), carboxylate (COO$^-$M$^+$), a nonionic group, a C$_1$-C$_{12}$ alkyl group, a C$_1$-C$_{12}$ hydroxyalkyl group, a C$_1$-C$_{12}$ cycloalkyl group, a C$_1$-C$_{12}$ aryl group, a C$_1$-C$_{12}$ aralkyl group and a quaternary ammonium ion, wherein M+ is a cation, wherein the amount effective to increase the open time is an amount the additive greater than about 1% by weight of the polymer.

* * * * *